United States Patent
Matsuda et al.

(10) Patent No.: US 8,634,112 B2
(45) Date of Patent: Jan. 21, 2014

(54) DOCUMENT PROCESSING APPARATUS FOR GENERATING AN ELECTRONIC DOCUMENT

(75) Inventors: Hideyuki Matsuda, Suita (JP); Kazumi Sawayanagi, Itami (JP); Toshihiko Otake, Ikeda (JP); Masao Hosono, Toyokawa (JP); Manabu Furukawa, Nagaokakyo (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 411 days.

(21) Appl. No.: 12/970,296

(22) Filed: Dec. 16, 2010

(65) Prior Publication Data
US 2011/0149350 A1 Jun. 23, 2011

(30) Foreign Application Priority Data
Dec. 18, 2009 (JP) ................................ 2009-287527

(51) Int. Cl.
*H04N 1/40* (2006.01)
*G06K 9/00* (2006.01)
*G06T 11/00* (2006.01)

(52) U.S. Cl.
USPC ........... 358/462; 358/474; 358/450; 358/453; 358/1.9; 358/1.15; 382/100; 345/427; 345/469

(58) Field of Classification Search
None
See application file for complete search history.

(56) References Cited

U.S. PATENT DOCUMENTS

| | | | | |
|---|---|---|---|---|
| 5,555,362 A | * | 9/1996 | Yamashita et al. | 715/209 |
| 7,542,160 B2 | * | 6/2009 | Parry et al. | 358/1.15 |
| 2009/0315904 A1 | * | 12/2009 | Sugimoto et al. | 345/531 |

FOREIGN PATENT DOCUMENTS

| | | | |
|---|---|---|---|
| JP | 09-319632 | * | 12/1997 |
| JP | 09-319632 A | | 12/1997 |
| JP | 2008-305088 A | | 12/2008 |
| JP | 2009-288870 A | | 12/2009 |

OTHER PUBLICATIONS

Office Action (Notice of Reasons for Refusal) dated Nov. 8, 2011, issued in the corresponding Japanese Patent Application No. 2009-287527, and an English Translation thereof.

* cited by examiner

*Primary Examiner* — Steven Kau
(74) *Attorney, Agent, or Firm* — Buchanan Ingersoll & Rooney PC

(57) ABSTRACT

A document processing apparatus comprises an image reader for scanning an original manuscript which is not updated to generate first image data on the original manuscript and for scanning an updated manuscript to generate second image data on the updated manuscript, a text information extraction part for extracting first text information from the first image data and extracting second text information from the second image data, an updated portion detector for detecting an updated portion of the updated manuscript on the basis of the first text information and the second text information, an electronic document generator for generating an electronic document of the updated manuscript on the basis of the second image data, and a storage controller for generating display data of the updated portion on the basis of a detection result on the updated portion and storing the display data into the electronic document.

18 Claims, 38 Drawing Sheets

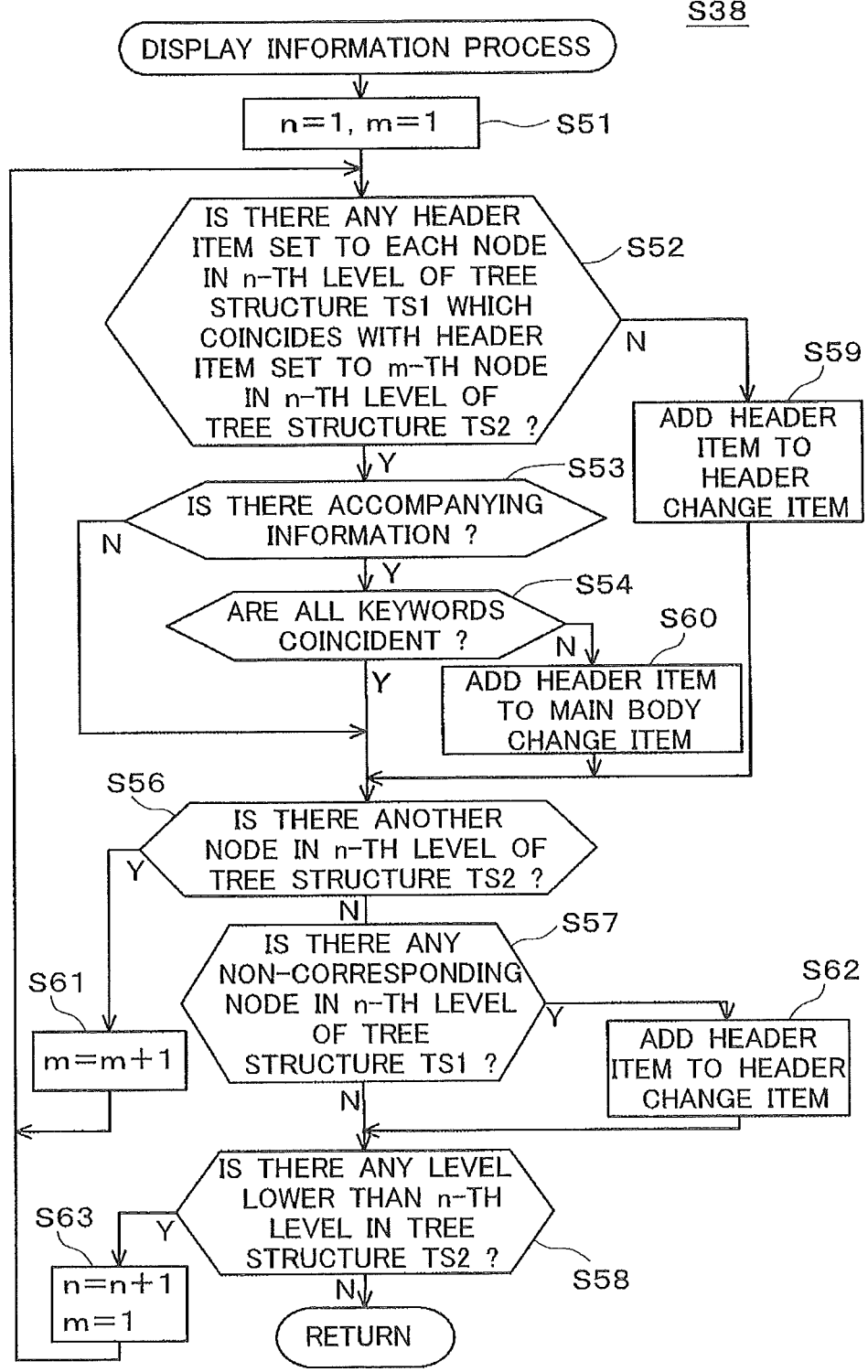

*Fig.6*

BUSINESS MANNER FOR NEW RECRUITS

1. GREETING

GREETING IS AN ESSENTIAL ELEMENT FOR ESTABLISHING A SMOOTH SOCIAL RELATIONSHIP...

2. NEAT AND ORGANIZED

KEEP THINGS NEAT AND ORGANIZED, AND YOU CAN MAKE ACCESS TO NECESSARY THINGS ANYTIME...

3. REPORTING, CONTACTING, AND CONSULTATION

DO REPORTING, CONTACTING, AND CONSULTATION, AND YOU WILL BE GIVEN AN INSTRUCTION NECESSARY TO EFFICIENTLY PROCEED WITH YOUR BUSINESS...

MS1

Fig.8
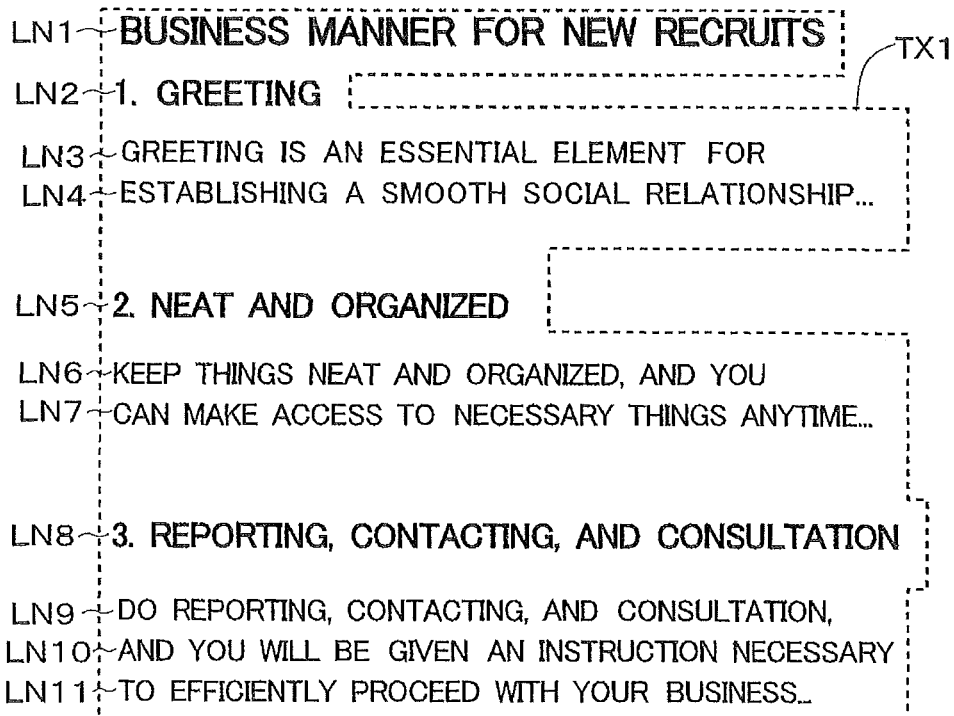
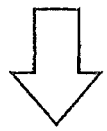
HL1 (LN1) ~ BUSINESS MANNER FOR NEW RECRUITS
HL2 (LN2) ~ 1. GREETING
HL3 (LN5) ~ 2. NEAT AND ORGANIZED
HL4 (LN8) ~ 3. REPORTING, CONTACTING, AND CONSULTATION

Fig.19

| DOCUMENT | USER | DESTINATION ADDRESS | SENDING TIME | JOB ID |
|---|---|---|---|---|
| x x x | USER1 | ○○@□ | --- | 0001 |
| x x x | USER2 | ○○@□ | --- | 0002 |
| x x x | USER1 | ○○@□ | --- | 0003 |
| PF1 | USER1 | DESTINATION | --- | 0004 |

SR1

| JOB ID | READ SETTING | HIERARCHIZED TEXT INFORMATION (TREE STRUCTURE) |
|---|---|---|
| 0001 | --- | |
| 0002 | --- | |
| 0003 | --- | |
| 0004 | --- | TS1 |

BUSINESS MANNER FOR NEW RECRUITS

1. DAILY GREETING

GREETING IS AN ESSENTIAL ELEMENT FOR ESTABLISHING A SMOOTH SOCIAL RELATIONSHIP...

2. NEAT AND ORGANIZED

KEEP THINGS NEAT AND ORGANIZED, AND YOU CAN MAKE ACCESS TO NECESSARY THINGS AND INFORMATION ANYTIME...

MS2(MS2a)

HL1(LN1) —— BUSINESS MANNER FOR NEW RECRUITS

HL2(LN2) —— 1. DAILY GREETING

HL3(LN5) —— 2. NEAT AND ORGANIZED

Fig.30

| DOCUMENT | USER | DESTINATION ADDRESS | SENDING TIME | JOB ID |
|---|---|---|---|---|
| ×××  | USER1 | ○○@□ | --- | 0001 |
| ××× | USER2 | ○○@□ | --- | 0002 |
| ××× | USER1 | ○○@□ | --- | 0003 |
| PF1 | USER1 | DESTINATION | --- | 0004 |
| PF2 | USER1 | DESTINATION | --- | 0005 |

SR1

| JOB ID | READ SETTING | HIERARCHIZED TEXT INFORMATION (TREE STRUCTURE) |
|---|---|---|
| 0001 | --- | |
| 0002 | --- | |
| 0003 | --- | |
| 0004 | --- | TS1 |
| 0005 | --- | TS2a |

Fig.31

BUSINESS MANNER FOR NEW RECRUITS

1. GREETING

GREETING IS AN ESSENTIAL ELEMENT FOR ESTABLISHING A SMOOTH SOCIAL RELATIONSHIP...

2. NEAT AND ORGANIZED

KEEP THINGS NEAT AND ORGANIZED, AND YOU CAN MAKE ACCESS TO NECESSARY THINGS ANYTIME...

3. REPORTING, CONTACTING, AND CONSULTATION

DO REPORTING, CONTACTING, AND CONSULTATION, AND YOU WILL BE GIVEN AN INSTRUCTION NECESSARY TO EFFICIENTLY PROCEED WITH YOUR BUSINESS...

4. TELEPHONE MANNER

RESPOND WITH YOUR FIRST COMMENT IN A CHEERFUL AND CLEAR VOICE...

MS2(MS2b)

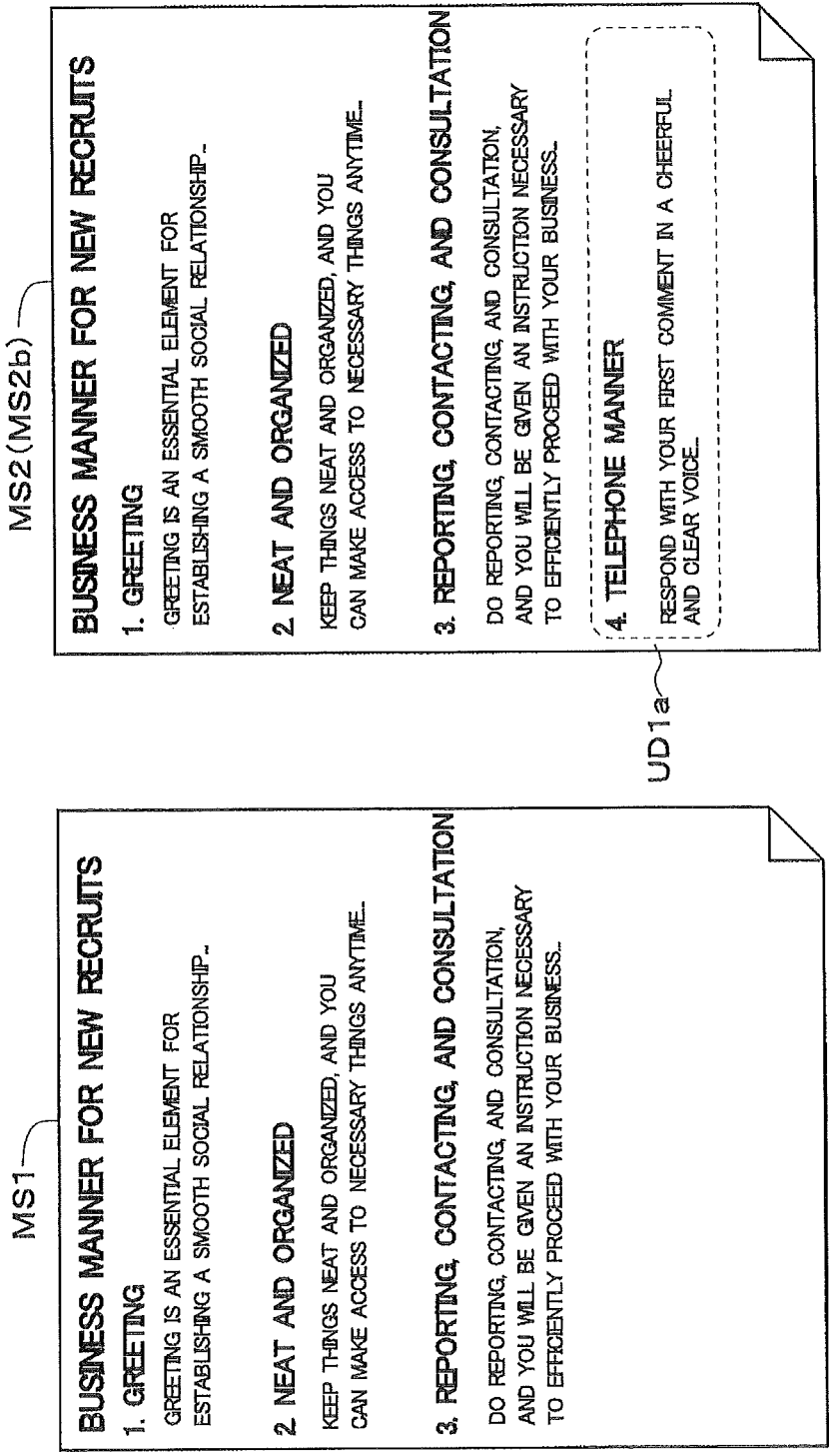

HL1(LN1) ~ BUSINESS MANNER FOR NEW RECRUITS

HL2(LN2) ~ 1. GREETING

HL3(LN5) ~ 2. NEAT AND ORGANIZED

HL4(LN8) ~ 3. REPORTING, CONTACTING, AND CONSULTATION

HL5(LN12) ~ 4. TELEPHONE MANNER

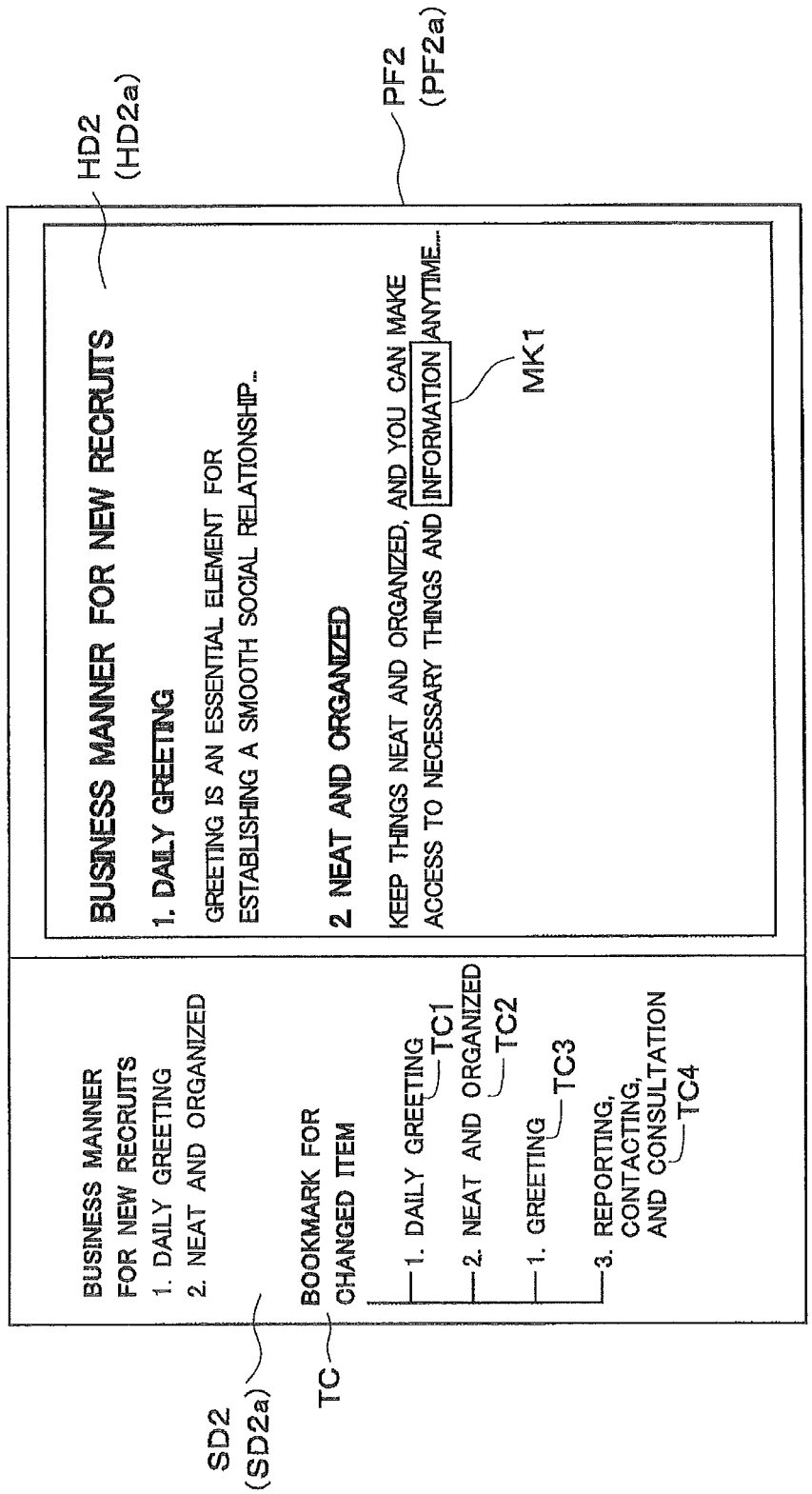

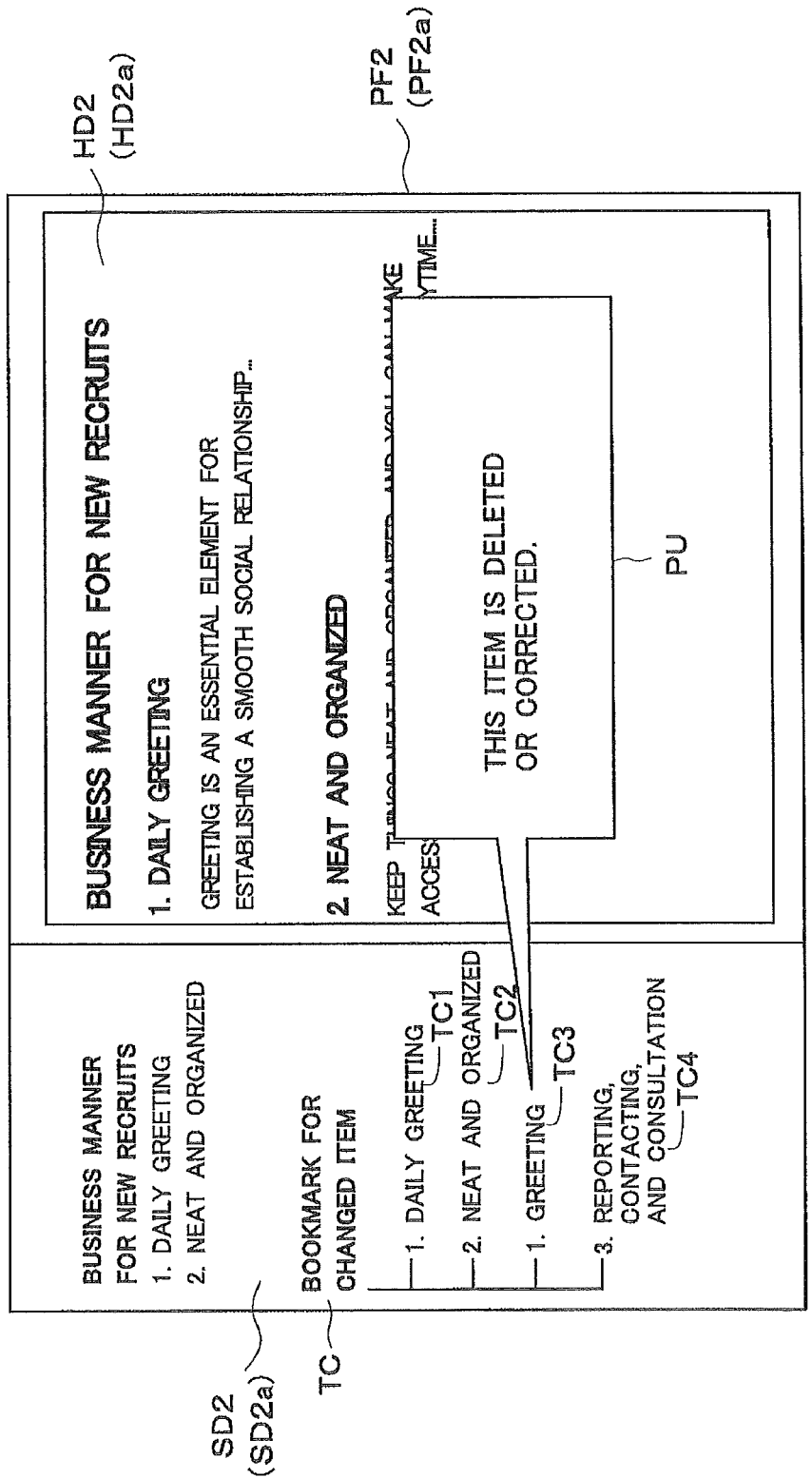

DOCUMENT PROCESSING APPARATUS FOR GENERATING AN ELECTRONIC DOCUMENT

This application is based on Japanese Patent Application No. 2009-287527 filed on Dec. 18, 2009, the contents of which are hereby incorporated by reference.

BACKGROUND OF THE INVENTION

1. Field of the Invention

The present invention relates to a document processing apparatus, and more particularly to a technique for generating an electronic document.

2. Description of the Background Art

There is an electronic document generation technique in which an original manuscript is scanned by an image reading apparatus to generate a document image of the original manuscript and an electronic document is generated on the basis of the document image (Japanese Patent Application Laid Open Gazette No. 2008-305088 (Patent Document 1)).

Patent Document 1, for example, discloses a document processing apparatus for generating an electronic document including a document image, which efficiently generates browse navigation information (bookmark information) in accordance with a content area included in the document image in order to generate the electronic document.

In some cases, however, after an electronic document of an original manuscript is generated, part of the original manuscript is updated and another electronic document of the manuscript is generated. In such a case, a reader who reads the electronic document of the updated manuscript sometimes wants to recognize updated portions in the updated manuscript. In order to recognize the updated portions in the updated manuscript, for example, the reader needs to check the electronic document of the updated manuscript against the electronic document of the original manuscript which is not updated.

This check operation is very laborious, however, and it is desirable to save the reader from such a laborious work (labor). If the technique disclosed in Patent Document 1 is used, it is hard to avoid doing such a check operation though the respective browse navigation information (bookmark information) on the electronic documents before and after the update are merely generated in this technique.

SUMMARY OF THE INVENTION

Then, it is an object of the present invention to provide a document processing apparatus which allows easy recognition of an updated portion in an updated manuscript.

The present invention is intended for a document processing apparatus. According to a first aspect of the present invention, the document processing apparatus comprises an image reader for scanning an original manuscript which is not updated to generate first image data on the original manuscript and for scanning an updated manuscript to generate second image data on the updated manuscript, a text information extraction part for extracting first text information from the first image data and extracting second text information from the second image data an updated portion detector for detecting an updated portion of the updated manuscript on the basis of the first text information and the second text information, an electronic document generator for generating an electronic document of the updated manuscript on the basis of the second image data, and a storage controller for generating display data of the updated portion on the basis of a detection result on the updated portion and storing the display data into the electronic document.

According to a second aspect of the present invention, the document processing apparatus comprises an image reader for scanning an original manuscript which is not updated to generate first image data on the original manuscript and for scanning an updated manuscript to generate second image data on the updated manuscript, a text information extraction part for extracting first text information from the first image data and extracting second text information from the second image data, an updated portion detector for comparing the first text information with the second text information to thereby detect an updated portion of the updated manuscript, an electronic document generator for generating an electronic document of the updated manuscript on the basis of the second image data, and a storage controller for storing display data of the updated portion which is generated on the basis of a detection result on the updated portion into a main body information area of an electronic mail to which the electronic document is attached.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a flowchart showing processing of display information;

FIG. 6 is a view showing an original manuscript which is not updated;

FIG. 8 is a view showing header items of the original manuscript;

FIG. 19 is a table showing a list of sending records;

FIG. 30 is a table showing a list of sending records;

FIG. 31 is a view showing an updated manuscript;

FIG. 32 is a view showing the original manuscript and the updated manuscript;

FIG. 41 is a view showing an electronic document of an updated manuscript in accordance with a variation; and FIG. 42 is a view showing an electronic document of an updated manuscript in accordance with another variation;

DESCRIPTION OF THE PREFERRED EMBODIMENTS

Hereinafter, the preferred embodiment of the present invention will be discussed with reference to figures.

<1. Constitution of Apparatus>

Figure 1:
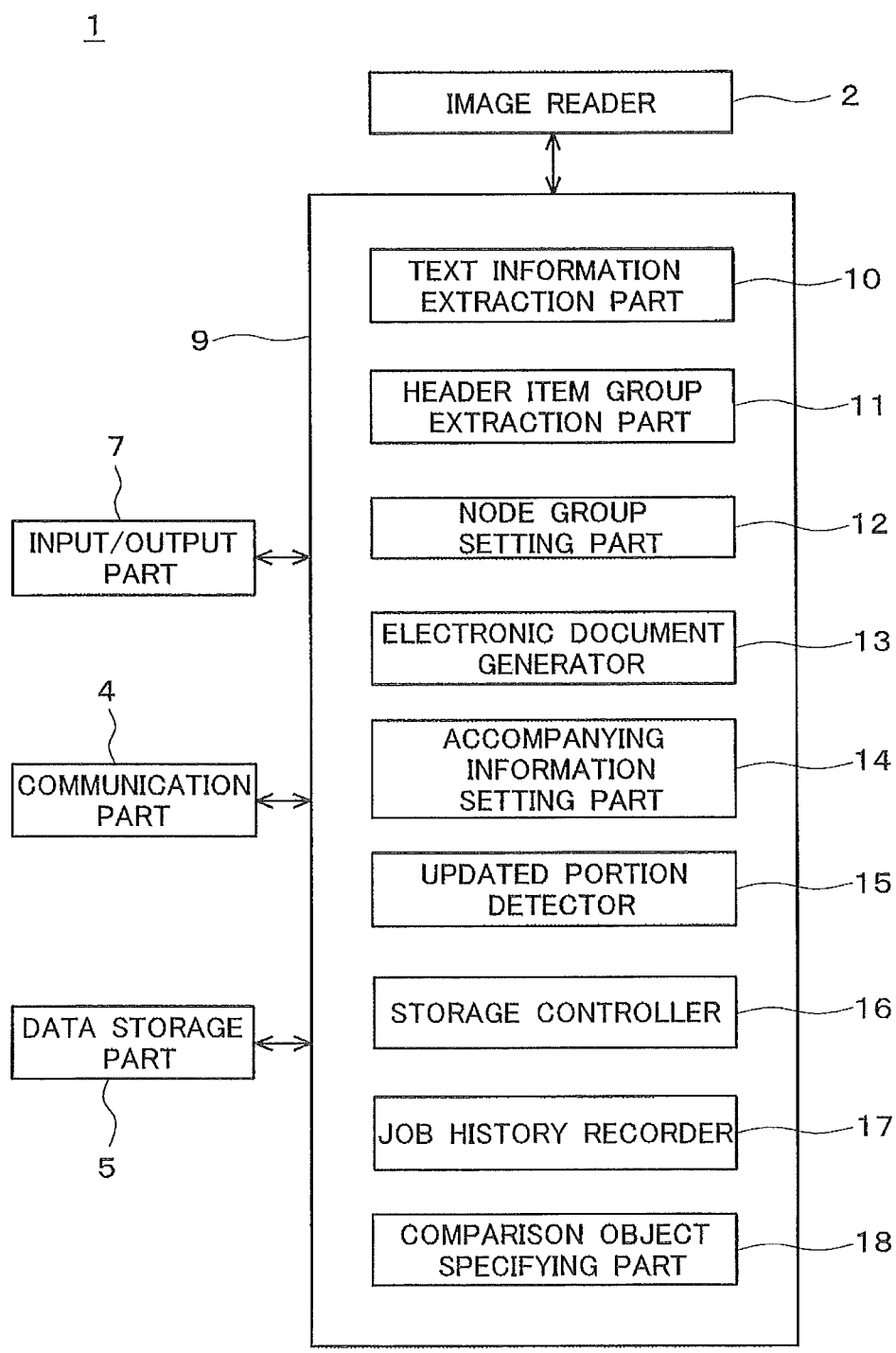
FIG. 1 is a view showing an overall constitution of an MFP in accordance with a preferred embodiment of the present invention.

FIG. 1 is a view showing an overall constitution of an MFP 1 in accordance with the preferred embodiment of the present invention.

As shown in FIG. 1, the MFP (Multi Function Peripheral) 1 comprises an image reader 2, a communication part 4, a data storage part 5, an input/output part 7, and a controller 9. A document processing function is implemented by the controller 9 and the like and the MFP 1 serves as a document processing apparatus.

The image reader 2 is a scanner and has a function of optically reading an original manuscript placed on a predetermined position of the MFP 1 and generating a scan image (in more detail, image data of a scan image) of the original manuscript.

The communication part 4 is a processing part capable of performing facsimile communication via public networks or the like. Further, the communication part 4 is capable of performing network communication via a communication network NW. The network communication uses various protocols such as TCP/IP (Transmission Control Protocol/Internet Protocol), FTP (File Transfer Protocol) and the like, and by using the network communication, the MFP 1 can transmit and receive various data to/from desired partners. Further, the MFP 1 can also transmit and receive electronic mails by using the network communication.

The data storage part 5 is a storage area for storing various data (image data, history data, and the like) and constituted of a RAM, a HDD, and the like.

The input/output part 7 has a receiving function for receiving an input for the MFP 1 and a display function for displaying various information and is constituted of a touch panel display (touch screen) and the like.

The controller 9 is a computer system (simply referred to as a computer) comprising a CPU, a RAM, a ROM, and the like and controls operations of the above-described processing parts in the MFP 1.

Further, the controller 9 causes the CPU to execute a predetermined software program PG, to thereby implement various functioning parts including a text information extraction part 10, a header item group extraction part 11, a node group setting part 12, an electronic document generator 13, an accompanying information setting part 14, an updated portion detector 15, a storage controller 16, a job history recorder 17, and a comparison object specifying part 18. The program PG is stored in an electronically rewritable nonvolatile memory (EEPROM or the like) or the like. Further, the program PG may be provided, being recorded in one of various types of recording media such as a CD-ROM, a DVD-ROM, a memory card, and the like, and then transmitted to the nonvolatile memory or the like in the MFP 1 from the recording medium which records it by a predetermined operation. In this case, the program PG is changeable. Furthermore, the program PG may be downloaded in the MFP 1 via a network.

The text information extraction part 10 extracts document information which is recognized by optical character recognition (OCR) from image data GA of a scan image, as text information TX.

The header item group extraction part 11 extracts a plurality of items serving as headers in the document (hereinafter, referred to also as "header items") as a header item group HL from the text information TX.

The node group setting part 12 hierarchizes the header item group HL to thereby construct a node group having a tree structure and sets each of the hierarchized header items to a corresponding one of nodes in the node group ND having the tree structure.

The electronic document generator 13 generates an electronic document of the original manuscript on the basis of the image data GA. As the electronic document, adopted is a data file (e.g., a PDF (Portable Document Format) file with bookmarks) in a format having a main body information area HI and a bookmark information area (referred to also as an additional information area) SI, or the like. The electronic document generator 13 has a bookmark making function for making a "bookmark" for the electronic document in generation of the electronic document. Specifically, the electronic document generator 13 makes bookmark information (hereinafter, referred to also as "index information") displayed in a bookmark display area SD (see FIG. 11) (described later) of the electronic document on the basis of the header item group HL hierarchized by the node group setting part 12.

The accompanying information setting part 14 extracts each of keyword groups KW relating to the header items set to the nodes in the tree structure from the text information TX and sets the extracted keyword group KW to accompanying information of each node.

The updated portion detector 15 detects an updated portion in the updated manuscript on the basis of the text information TX of the original manuscript which is not updated (the text information is also represented as "TX1") and the text information TX of the updated manuscript (the text information is also represented as "TX2").

Specifically, the updated portion detector 15 compares the node group of the tree structure relating to the original manuscript with the node group of the tree structure relating to the updated manuscript, to thereby detect an updated portion in the updated manuscript. In more detail, the updated portion detector 15 compares the header item set to each node in the tree structure relating to the original manuscript with the header item set to each node in the tree structure relating to the updated manuscript, to thereby detect the updated portion (in more detail, a header change item (described later)) in the updated manuscript. Further, the updated portion detector 15 compares the accompanying information set to the node in the tree structure relating to the original manuscript with the accompanying information set to the node in the tree structure relating to the updated manuscript, to thereby detect the updated portion (in more detail, a main body change item (described later)) in the updated manuscript.

The storage controller 16 generates data (display data of the updated portion) used for displaying the updated portion in the updated manuscript on the basis of the detection result on the updated portion and stores the display data of the updated portion into the electronic document of the updated manuscript.

The job history recorder 17 records a job history which is history information on a plurality of reading jobs (scan jobs) including scan jobs of the original manuscript into the data storage part 5. In more detail, the job history recorder 17 records the job history on the plurality of reading jobs each of which is associated with text information (structured keyword information and the like) of an electronic document relating thereto. The "reading jobs" include at least a job made only by a scan operation, a job made by combination of the scan operation and a send operation, and the like. In more detail, the "reading jobs" include a sending job for scanning an original manuscript to generate a scan image and sending an electronic document generated from the scan image to any type destination via FTP communication or the like, and the like.

The comparison object specifying part 18 selects and specifies a reading job relating to the original manuscript, out of the plurality of reading jobs recorded as the job history. In more detail, in accordance with the selection made by an operator, the reading job relating to the original manuscript is selected and specified as a reading job which has information on the original manuscript to be compared with the updated manuscript <2. Outline of Operation>

In the preferred embodiment, discussion will be made on a case where the MFP 1 generates an electronic document of the original manuscript and sends the electronic document to a predetermined destination, and then the MFP 1 generates an electronic document of the updated manuscript and sends the electronic document to the predetermined destination again. In the preferred embodiment, when the MFP 1 generates the electronic document of the updated manuscript, the MFP 1 detects an updated portion in the updated manuscript and stores the display data (display information) of the updated portion into the electronic document.

Figure 20:
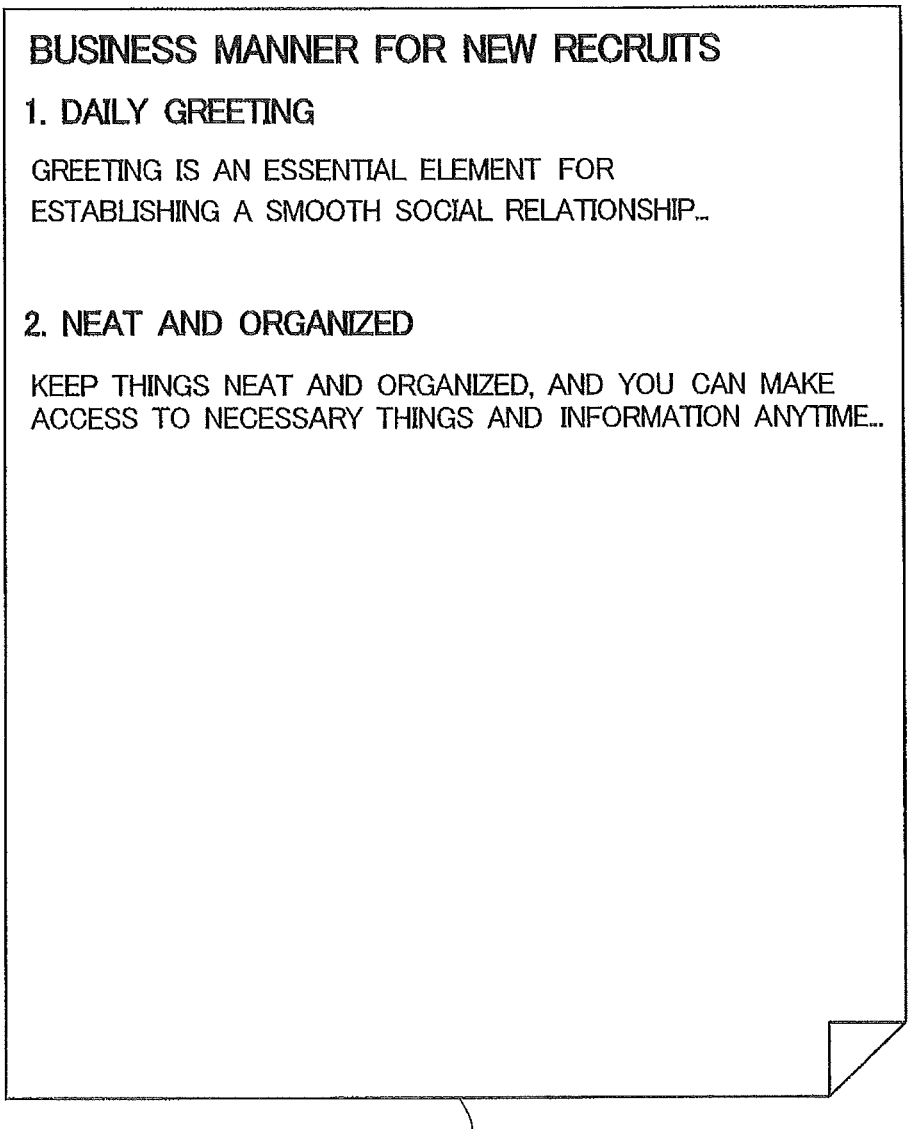
FIG. 20 is a view showing an updated manuscript.

First, discussion will be made on an exemplary case where a manuscript MS1 shown in FIG. 6 is adopted as the original manuscript which is not updated and a manuscript MS2 (MS2*a*) shown in FIG. 20 is adopted as the updated manuscript.

<3. Operation for Original Manuscript>

Figure 2:
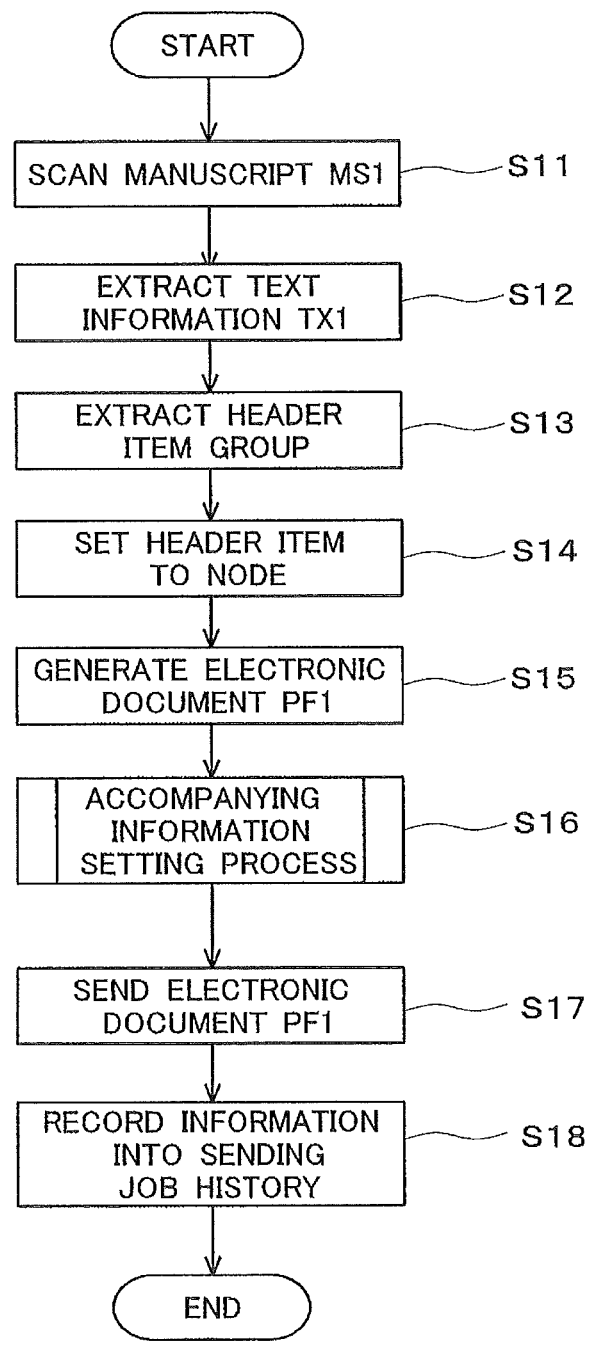
FIG. 2 is a flowchart showing processing for an original manuscript which is not updated.

First, with reference to the flowchart of FIG. 2, an operation for the original manuscript will be discussed. FIG. 2 is a flowchart showing processing for the original manuscript.

In Step S11, the image reader 2 optically reads the manuscript MS1 (see FIG. 6) which is an original manuscript and generates image data GA1 (see FIG. 7) which is a scan image of the manuscript MS1.

Figure 7:
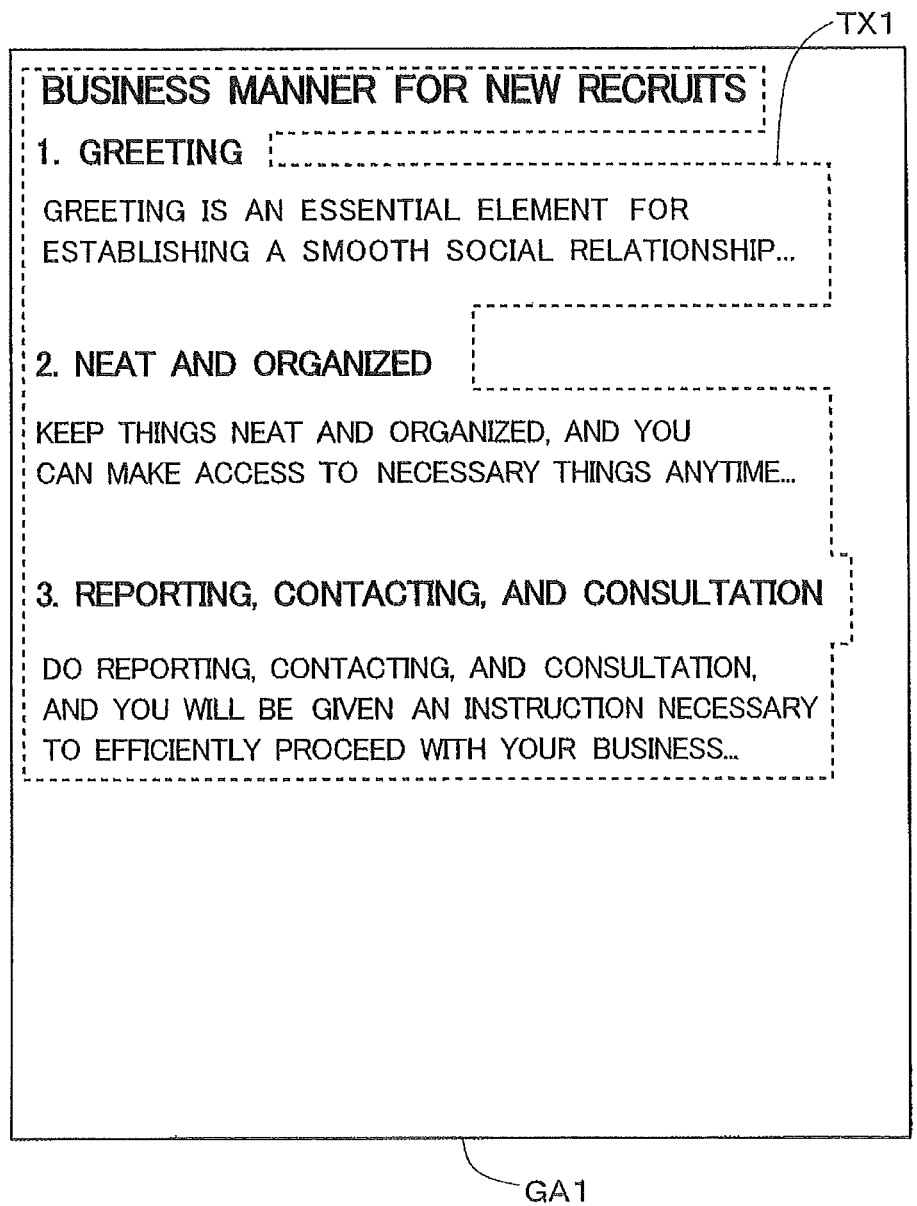
FIG. 7 is a view showing image data and text information of the original manuscript.
Figure 9:
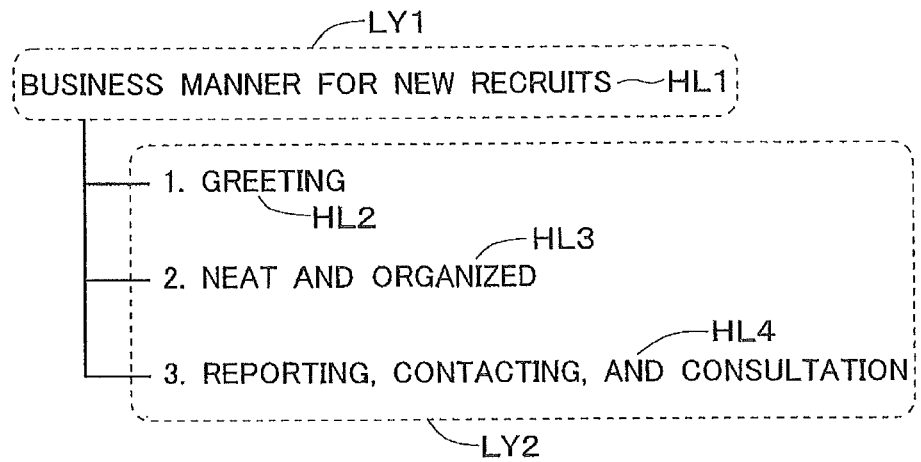
FIG. 9 is a view showing the hierarchized header items of the original manuscript.

In next Step S12, as shown in FIG. 7, the text information extraction part 10 recognizes character information by optical character recognition (OCR) or the like from the image data GA1 and extracts the character information as text information TX1.

In Step S13, as shown in FIG. 8, the header item group extraction part 11 extracts items serving as headers of the document from the text information TX1 as a header item group. Specifically, the header item group extraction part 11 first breaks down the text information TX1 into pieces of line information LNi (LN1 to LN11).

Further, the header item group extraction part 11 extracts the pieces of line information (character information on the corresponding lines) which satisfy an extraction condition for the header items, out of line information LNi, as header items. Herein, as the extraction condition for the header items, adopted is any one of conditions that "each of the characters in each of the line information LNi has a specific size or larger" and that "the beginning of each of the line information LNi is a numeral character (indicating a header number")". Then, the header item group extraction part 11 extracts pieces of line information LN1, LN2, LN5, and LN8 out of the line information LNi, which satisfy the extraction condition, as header items HL1, HL2, HL3, and HL4.

Next, in Step S14, the node group setting part 12 hierarchizes the header item group HLi (HL1, HL2, HL3, and HL4) to thereby construct a node group having a tree structure.

Specifically, the node group setting part 12 first determines the hierarchy of the header items HL1, HL2, HL3, and HL4 in accordance with "the size of characters", "the header number", "the number of indents", and the like. More specifically, the header item HL1 is allocated to the first level LY1 and the header items HL2, HL3, and HL4 are allocated to the second level LY2.

Figure 10:
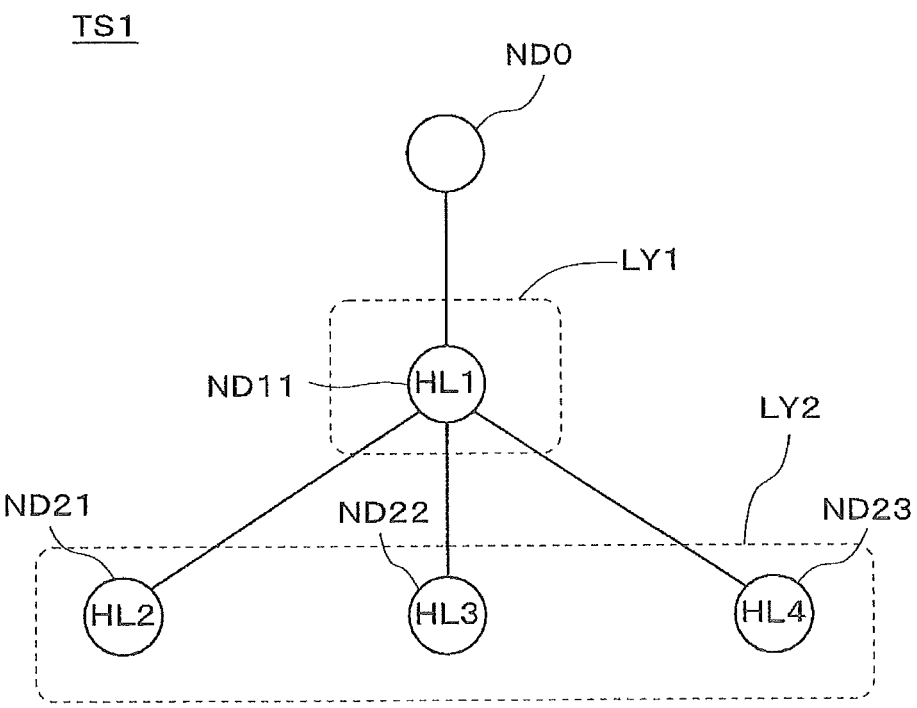
FIG. 10 is a view showing a tree structure relating to the original manuscript.

After that, the node group setting part 12 sets each of the header items in the hierarchized header item group HLi to the corresponding node in the node group of a tree structure TS1, in more detail, as shown in FIG. 10, the node group setting part 12 sets the header item HL1 to a node ND11 in the first level LY1 and sets the header items HL2, HL3, and HL4 to nodes ND21, ND22, and ND23, respectively, in the second level LY2. A node ND0 shown in FIG. 10 represents a root node.

Figure 11:
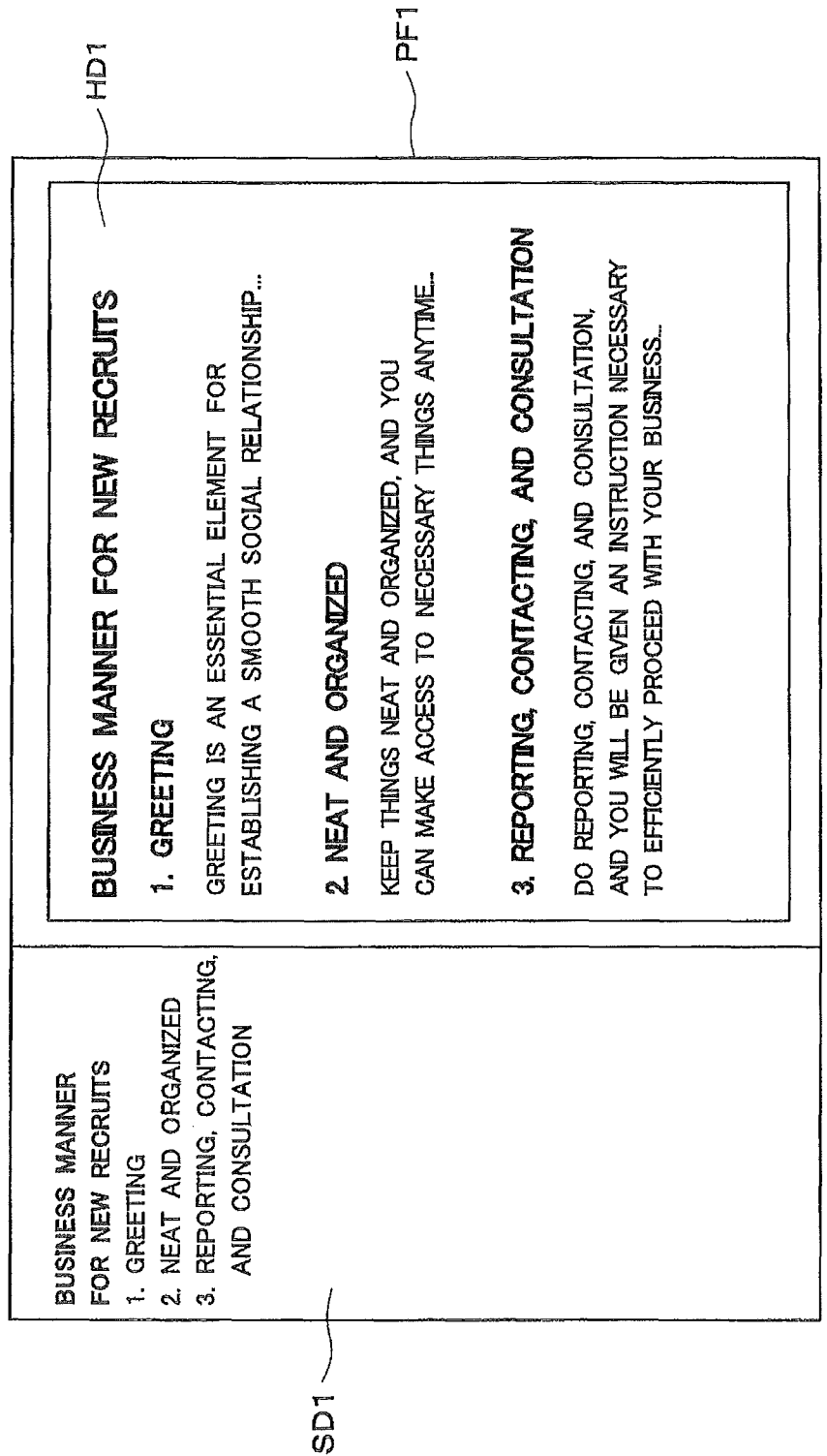
FIG. 11 is a view showing an electronic document of the original manuscript.

Next, in Step S15, the electronic document generator 13 generates an electronic document PF1 (see FIG. 11) of the original manuscript MS1 on the basis of the image data GA1. Herein, as the electronic document PF1, adopted is a data file (e.g., a PDF file with bookmarks) in a format having a main body information area HI1 (not shown) and a bookmark information area S11 (not shown). As shown in FIG. 11, the electronic document PF1 is displayed on a display screen, including a main body display area HD1 and a bookmark display area SD1.

Then, the electronic document generator 13 stores main body information generated on the basis of the image data GA1 into the main body information area HI1 and stores index information generated on the basis of the header items HLi into the bookmark information area S11. When the electronic document PF1 is browsed, as shown in FIG. 11, the main body information is displayed in the main body display area HD1 and the index information (header items) is displayed in the bookmark display area SD1.

The electronic document generator 13 further embeds information (link information) for linking the header items constituting the index information with the corresponding main body information into the electronic document PF1. When a reader who reads the electronic document PF1 selects one of the header items displayed in the bookmark display area SD1, the main body information corresponding to the selected header item can be thereby displayed in the main body display area HD1.

Then, in Step S16, the accompanying information setting part 14 sets accompanying information to each node in the node group of the tree structure TS1. Specifically, the accompanying information setting part 14 executes process steps (Steps S71 to S76) in the flowchart of FIG. 4, to thereby set the accompanying information for each node in the tree structure.

Hereinafter, with reference to the flowchart of FIG. 4, discussion will be made on an operation for setting the accompanying information to each node in the tree structure TS1.

In Step S71, the accompanying information setting part 14 selects one of the nodes to be processed. Specifically, the accompanying information setting part 14 first selects the node ND11 (see FIG. 10) as a node to be processed.

Figure 12:
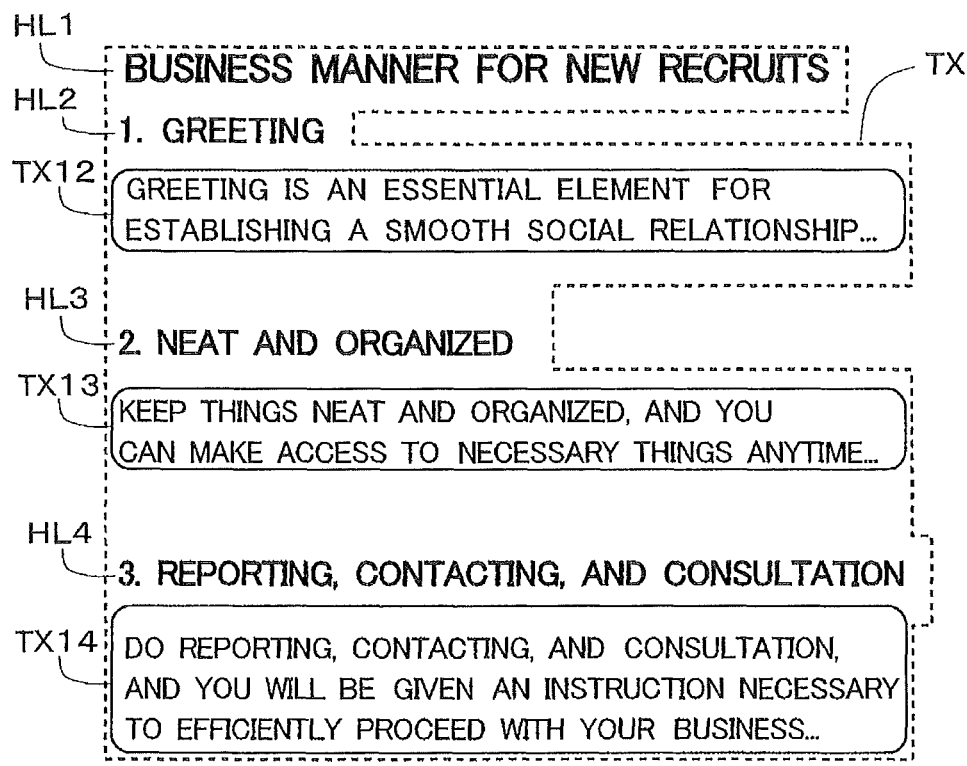
FIG. 12 is a view showing image data and text information of the original manuscript.

Next, in Step S72, the accompanying information setting part 14 determines whether or not there is text information relating to the node ND11. In more detail, the accompanying information setting part 14 determines whether or not there exists text information between the header item HL1 corresponding to the node ND11 to be processed and the header item HL2 corresponding to the next node ND21. Herein, as shown in FIG. 12, there is no text information between the header item HL1 and the header item HL2 and the accompanying information setting part 14 determines that there is no text information relating to the node ND11. Then, the process goes back to Step S71.

Back in Step S71, the accompanying information setting part 14 selects one of the nodes to be next processed. Specifically, the accompanying information setting part 14 selects the next node ND21 (see FIG. 10) to be processed this time.

Next, in Step S72, the accompanying information setting part 14 determines whether or not there is text information relating to the node ND21. In more detail, the accompanying information setting part 14 determines whether or not there exists text information between the header item HL2 corresponding to the node ND21 to be processed and the header item HL3 corresponding to the next node ND22. Herein, as shown in FIG. 12, text information TX12 is present between the header item HL2 and the header item HL3 and the accompanying information setting part 14 determines that there exists text information relating to the node ND21. Then, the process goes to Step S73.

In Step S73, the accompanying information setting part 14 extracts the text information TX12 which is present between the header item HL2 and the header item HL3 as shown in FIG. 12.

Figure 13:
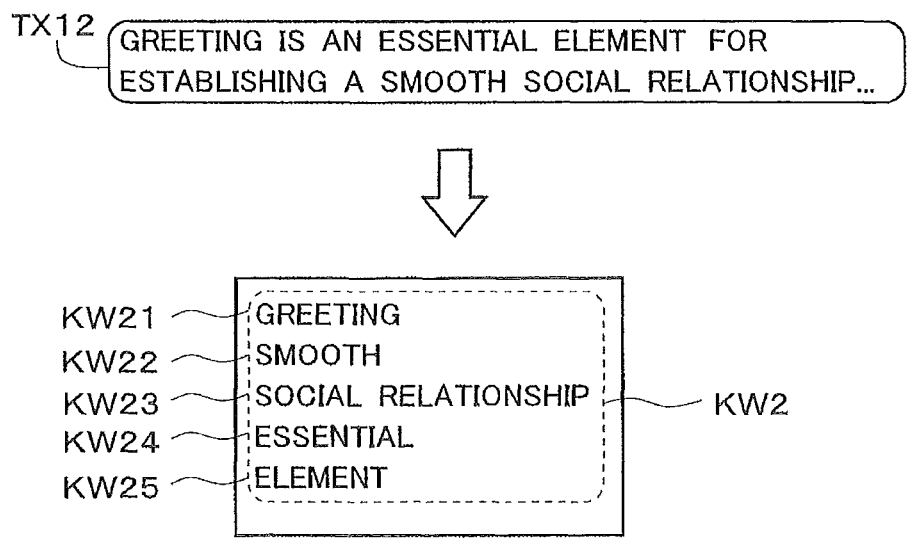
FIG. 13 is a view showing a keyword group extracted from main body information.

Next, in Step S74, the accompanying information setting part 14 extracts nouns out of the text information extracted in Step S73, as a keyword group. Specifically, the accompanying information setting part 14 extracts a keyword group KW2 out of the text information TX12 as shown in FIG. 13. The keyword group KW2 includes keywords KW21 ("greeting"), KW22 ("smooth"), KW23 ("social relationship"), KW24 ("essential"), and KW25 ("element").

Figure 14:
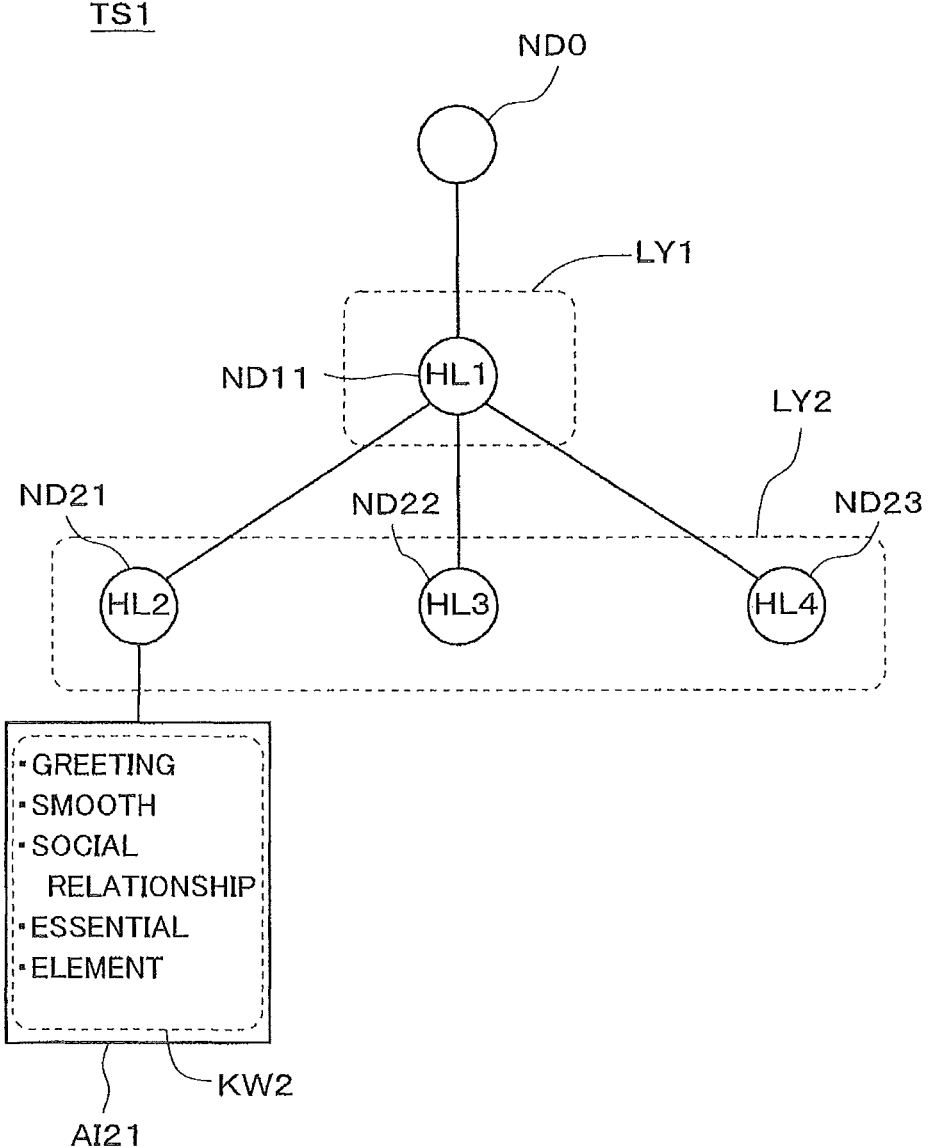
FIG. 14 is a view showing the tree structure with a piece of accompanying information.

Next, in Step S75, as shown in FIG. 14, the accompanying information setting part 14 sets the keyword group KW2 as accompanying information AI21 of the node ND21.

Next, in Step S76, the accompanying information setting part 14 determines whether or not there is any node in the tree structure TS1 for which the accompanying information setting process has not been performed. Herein, since there remain nodes (ND22 and ND23) for which the accompanying information setting process has not been performed, the process goes back to Step S71.

The accompanying information setting part 14 performs the same operation for the nodes ND22 and ND23 as discussed above, to thereby set respective accompanying information to the nodes ND22 and ND23.

Figure 15:
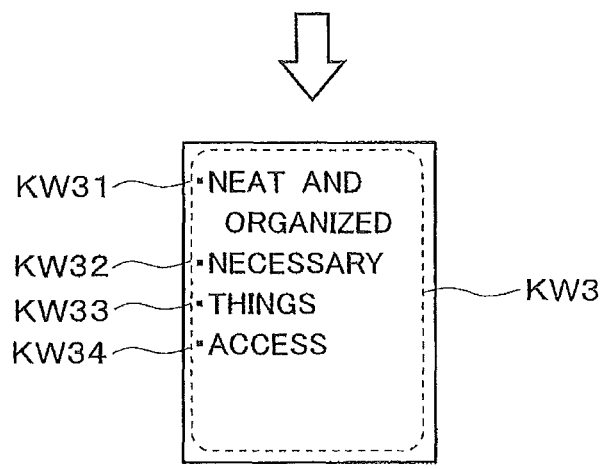
FIG. 15 is a view showing a keyword group extracted from main body information.
Figure 16:
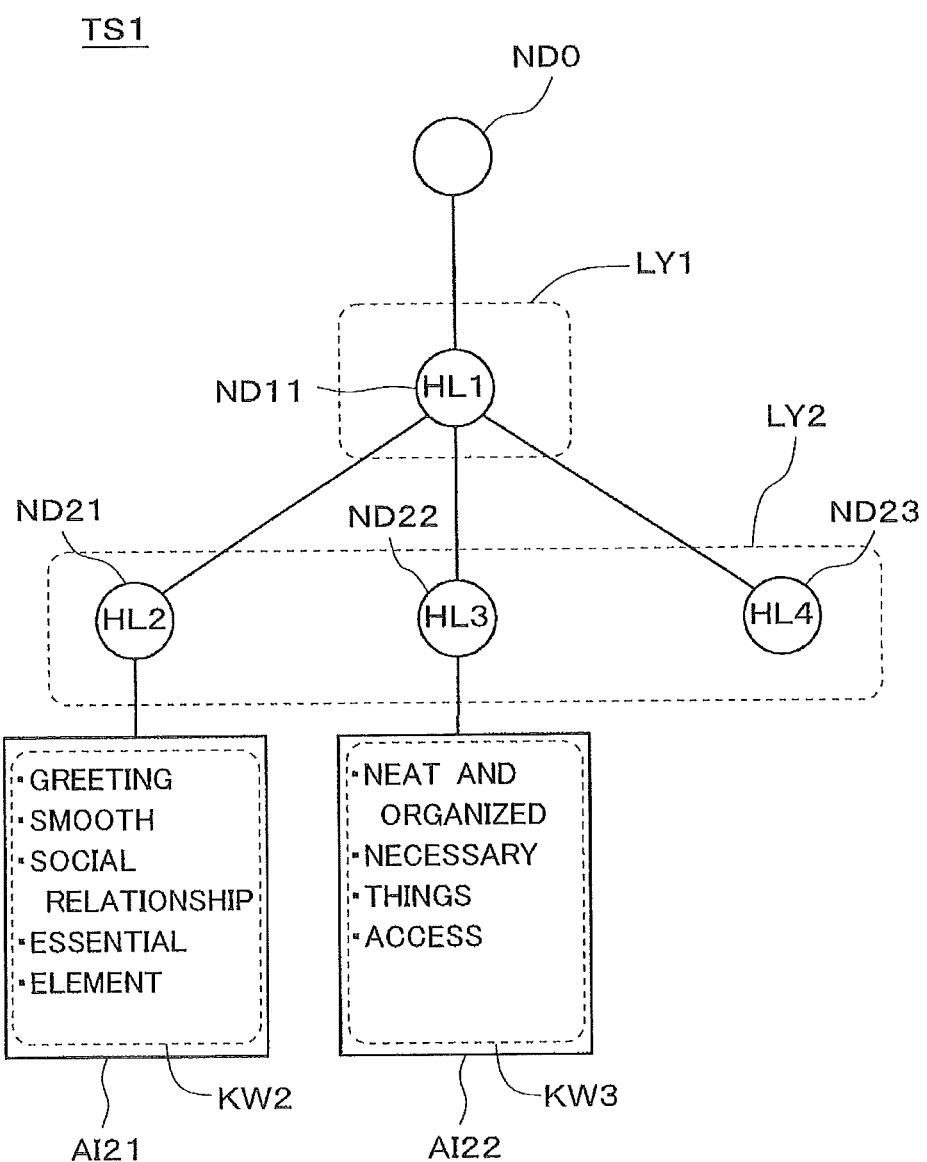
FIG. 16 is a view showing the tree structure with pieces of accompanying information.

Specifically, the accompanying information setting part 14 first acquires text information TX13 which is present between the header item HL3 and the header item HL4 as text information relating to the node ND22 (see FIG. 10) (Steps S71 to S73). Further, as shown in FIG. 15, a keyword group KW3 including keywords KW31, KW32, KW33, and KW34 is extracted out of the text information TX13 (in Step S74). Then, as shown in FIG. 16, the keyword group KW3 is set as accompanying information AI22 of the node ND22 (in Step S75).

Figure 17:
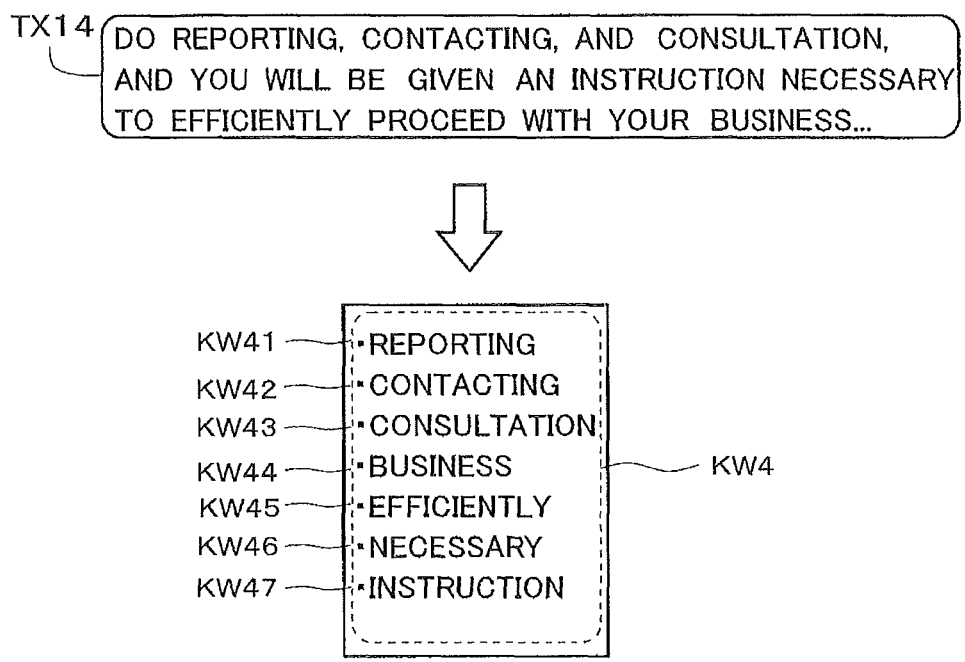
FIG. 17 is a view showing a keyword group extracted from main body information.
Figure 18:
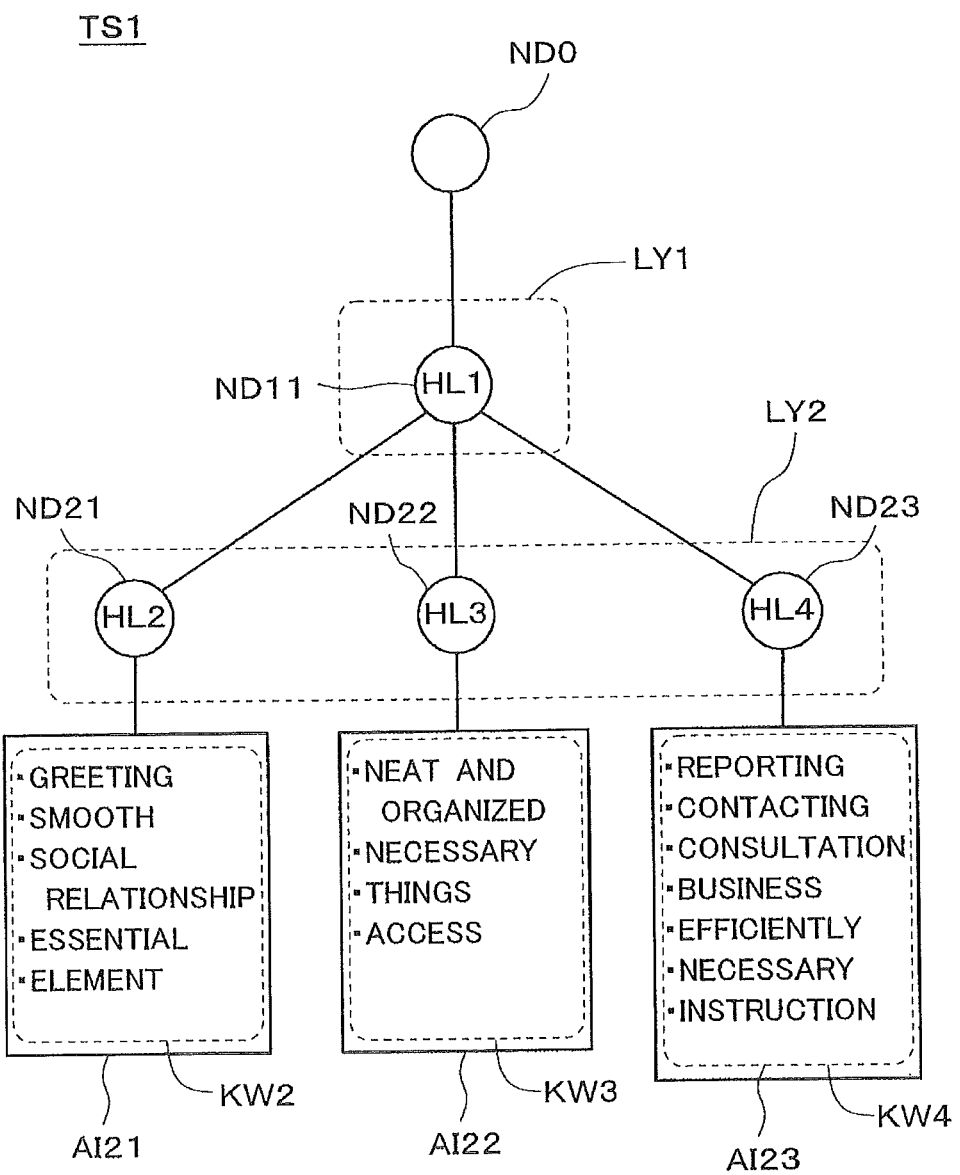
FIG. 18 is a view showing the tree structure with pieces of accompanying information.

Similarly, the accompanying information setting part 14 first acquires text information TX14 (see FIG. 12) which is present between the header item HL4 and the end of the text information TX1 as text information relating to the node ND23 (see FIG. 10) (Steps S71 to S73). Further, as shown in FIG. 17, a keyword group KW4 including keywords KW41 to KW47 is extracted out of the text information TX14 (in Step S74). Then, as shown in FIG. 18, the keyword group KW4 is set as accompanying information AI23 of the node ND23 (in Step S75).

Figure 4:
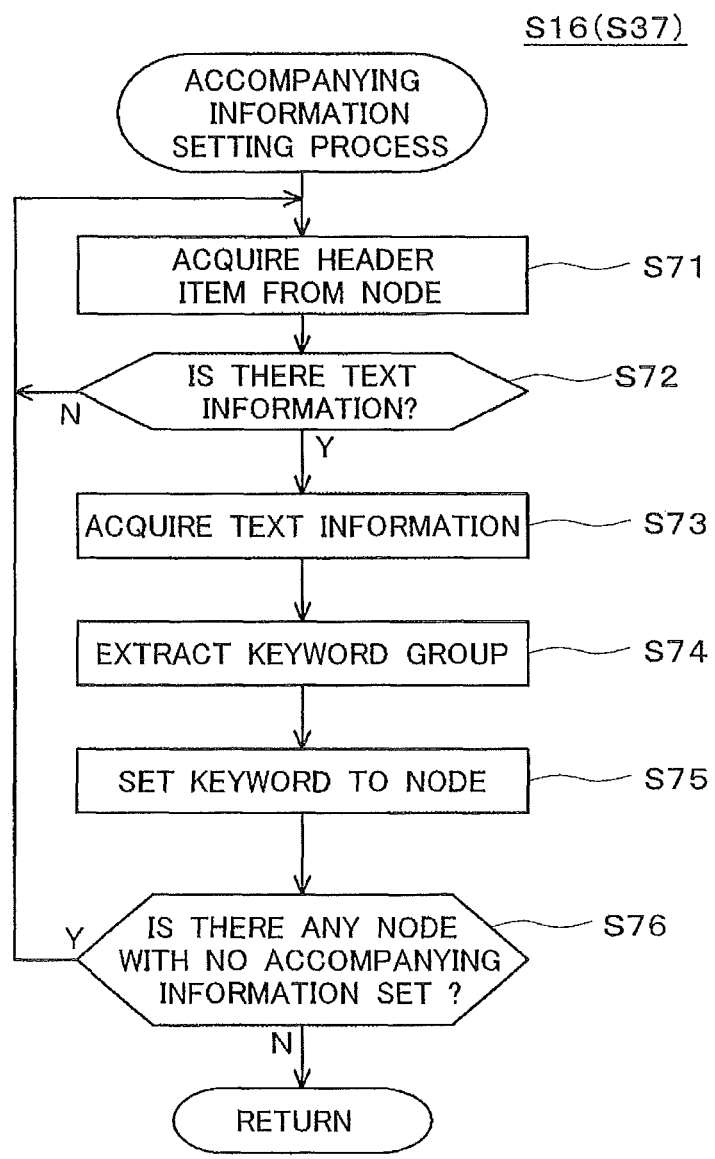
FIG. 4 is a flowchart showing a procedure of setting accompanying information.

After that, in Step S76, the accompanying information setting part 14 determines that there is no node remaining in the tree structure TS1, for which the accompanying information setting process has not been performed, and then a subroutine process shown in FIG. 4 is completed and the process goes to Step S17 (in FIG. 2).

In Step S17, the communication part 4 sends the electronic document PF1 generated by the electronic document generator 13 to a predetermined destination. The communication part 4 sends the electronic document PF1 via the network communication using FTP, for example. The communication method is not limited to this, but the communication part 4 may send an electronic mail to which the electronic document PF1 is attached.

Next, in Step S18, the job history recorder 17 associates a sending record SR1 of a sending job for sending the electronic document PF1 with the tree structure TS1 relating to the electronic document PF1 and records the sending record SR1 associated with the tree structure TS1 into the data storage part 5. Specifically, as shown in FIG. 19, each sending record SR1 of the sending job has a document name, a user (sender) name, a destination address, sending time, and the like. The sending record SR1 is recorded, being associated with various information (specifically, "read setting", "hierarchized text information", and the like). As the hierarchized text information, recorded is tree structure data relating to the electronic document which is sent, or the like. For example, the tree structure TS1 relating to the electronic document PF1 is associated with the sending record SR1 to be recorded. As discussed later, even when the updated manuscript is compared with the original manuscript after some time elapsed from the end of the sending job of the original manuscript MS1, making access to the sending record SR1 of the original manuscript MS1, which is associated with the tree structure TS1 (text information TX1), eliminates the necessity of generating again the tree structure TS1 (text information TX1) relating to the original manuscript before the comparison.

<4. Operation for Updated Manuscript>

Figure 3:
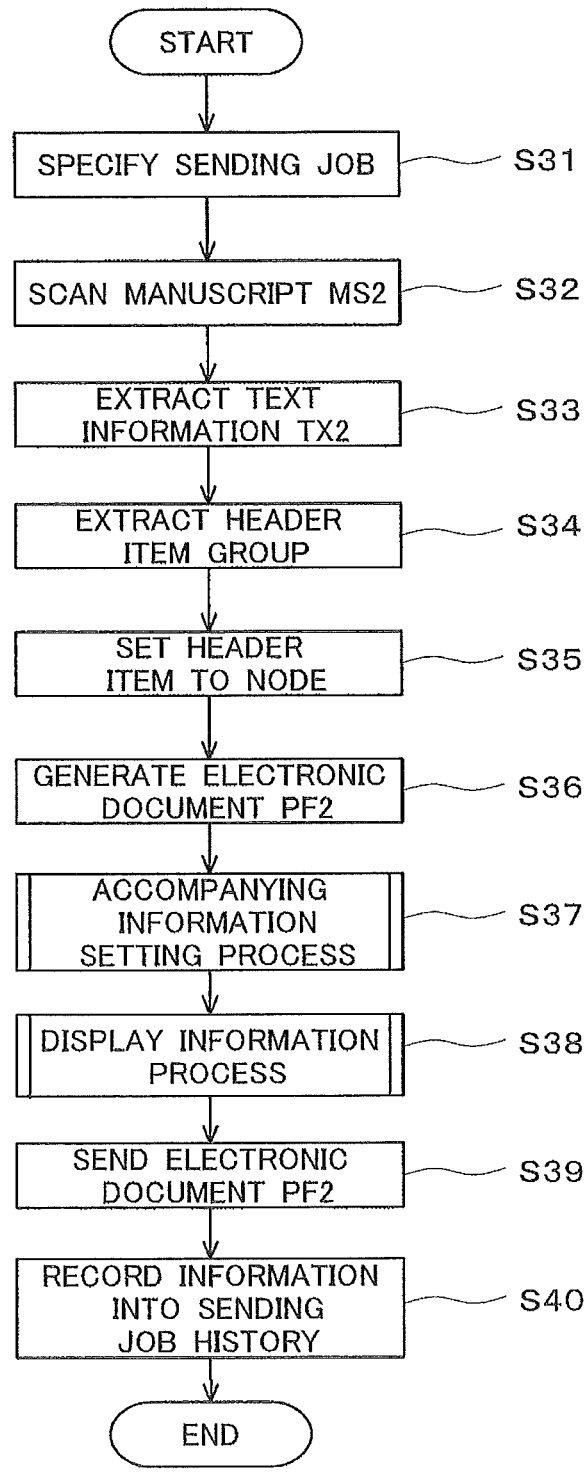
FIG. 3 is a flowchart showing processing for an updated manuscript.

Subsequently, with reference to the flowchart of FIG. 3, discussion will be made on an operation for the updated manuscript MS2 (MS2a), centering on a difference from the operation for the original manuscript MS1. FIG. 3 is a flowchart showing processing for the updated manuscript. The operation of the flowchart in FIG. 3 is performed after appropriate time elapsed from the execution of the sending job of the original manuscript MS1 (e.g., after several days elapsed from the execution of the sending job).

Figure 21:
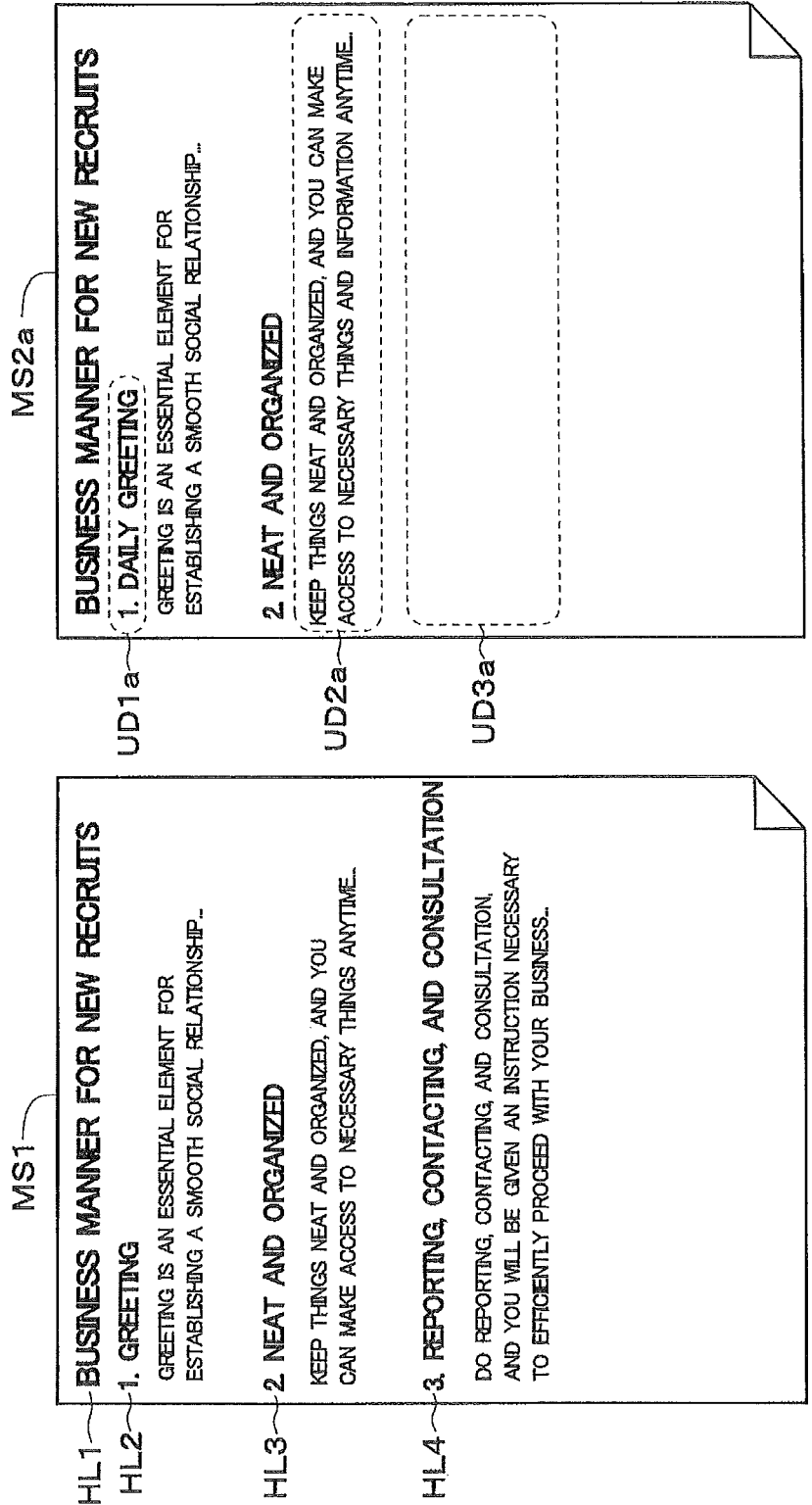
FIG. 21 is a view showing the original manuscript and the updated manuscript.

As shown in FIG. 21, the manuscript MS2a is a manuscript in which three portions (updated portions UD1a, UD2a, and UD3a) of the original manuscript MS1 are updated. In the updated portion UD1a, the header item HL1 is updated. Specifically, "1. Greeting" in the second line of the original manuscript MS1 is updated to "1. Daily Greeting". In the updated portion UD2a, the main body under the header item HL3 is updated. Specifically, ". . . access to necessary things anytime" in the sixth to seventh lines of the original manuscript MS1 is updated to " . . . access to necessary things and information anytime". In the updated portion UD3a, the header item HL4 and the main body under the header item HL4 are deleted. Specifically, "3. Reporting, Contacting, and Consultation" in the ninth line of the original manuscript MS1 and the following sentences of the main body are deleted.

In Step S31 of FIG. 3, first, the operator selects one sending record SR1 from a list of sending records (a plurality of sending records) (see FIG. 19) displayed on the input/output part 7. In response to the selection, the comparison object specifying part 18 specifies the selected sending record SR1 out of the sending records shown in the list (see FIG. 19) as a job (job before the update) to be used for detection of the updated portion. Then, the text information TX1 recorded in the data storage part 5, being associated with the reading job of the specified sending record SR1, is acquired from the data storage part 5 as text information to be compared with the text information of the updated manuscript.

After that, as discussed later, text information TX2 acquired by additional scan operation is compared with the text information TX1 acquired from the data storage part 5 and the updated portions in the manuscript are thereby detected.

Specifically, first, the MFP 1 executes the process steps from Step S32 to Step S37 for the manuscript MS2a, to thereby perform the operation for acquiring the text information TX2 of the updated manuscript, and the like. The process operations in Steps S32 to S37 are the same as those in Steps S11 to S16 of FIG. 2.

In Step S32, the image reader 2 generates image data (scan image data) GA2a (see FIG. 22) on the manuscript MS2a.

Figure 22:
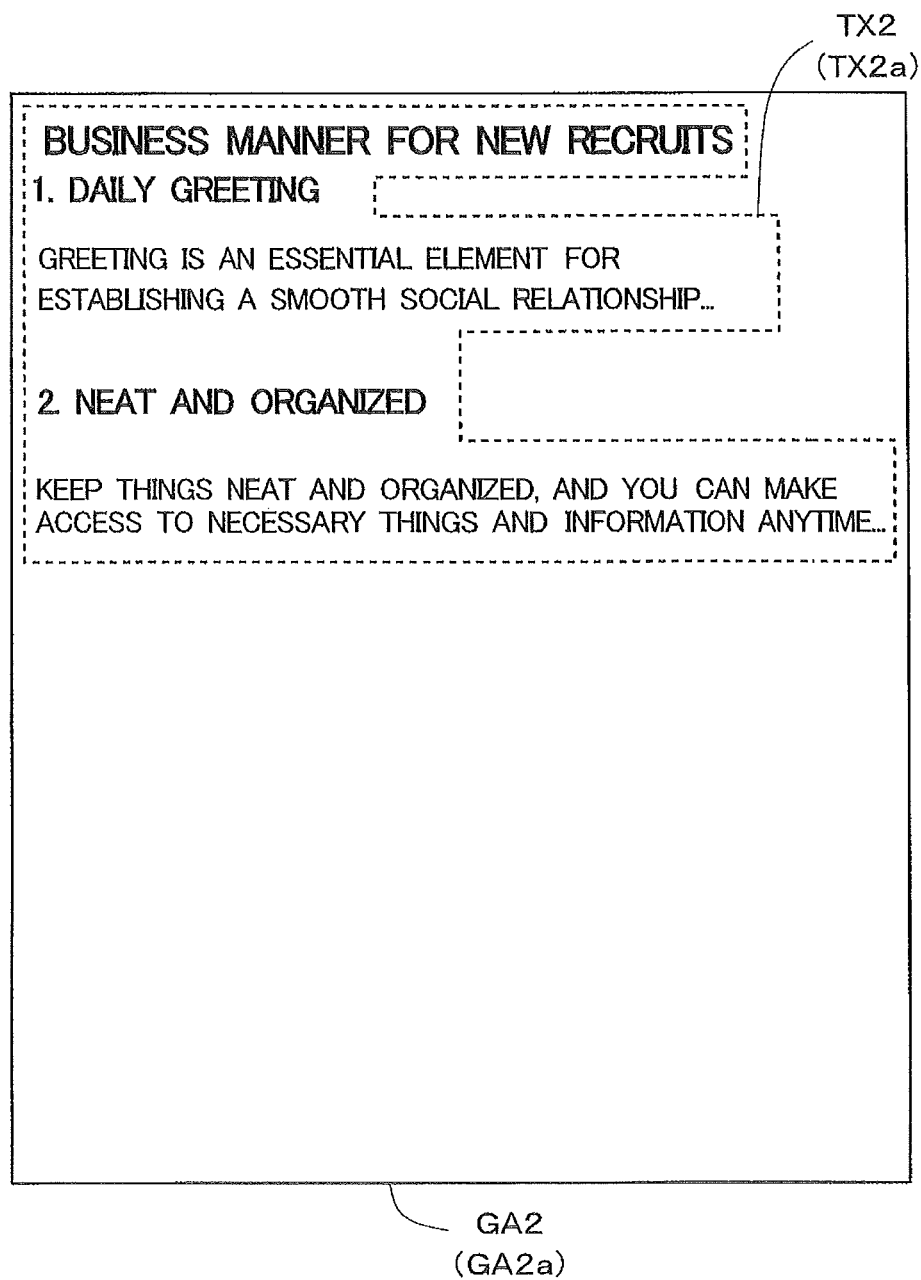
FIG. 22 is a view showing image data and text information of the updated manuscript.

In Step S33, the text information extraction part 10 extracts the text information TX2 (TX2a) from the image data GA2 (GA2a) as shown in FIG. 22.

Figure 23:
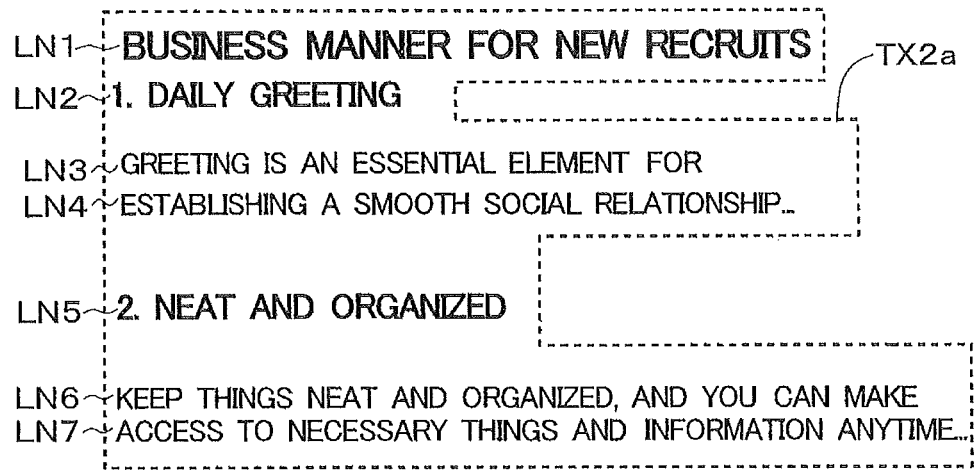
FIG. 23 is a view showing header items of the updated manuscript.

Further in Step S34, the header item group extraction part 11 extracts a plurality of header items (line information LN1, LN2, and LN5) as the header item group HLi (H11, H12, and HL3) from the text information TX2a as shown in FIG. 23.

Figure 24:
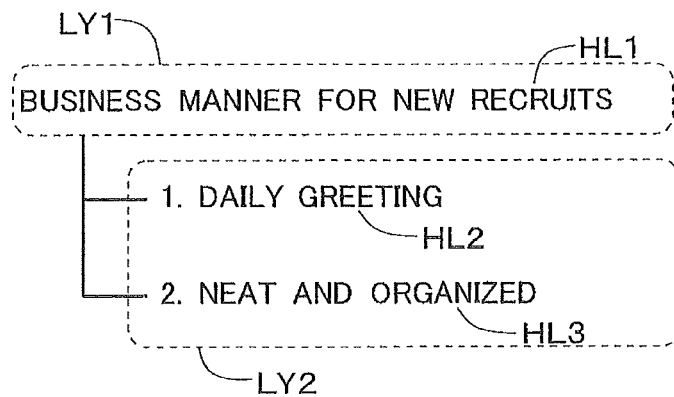
FIG. 24 is a view showing the hierarchized header items of the updated manuscript.
Figure 25:
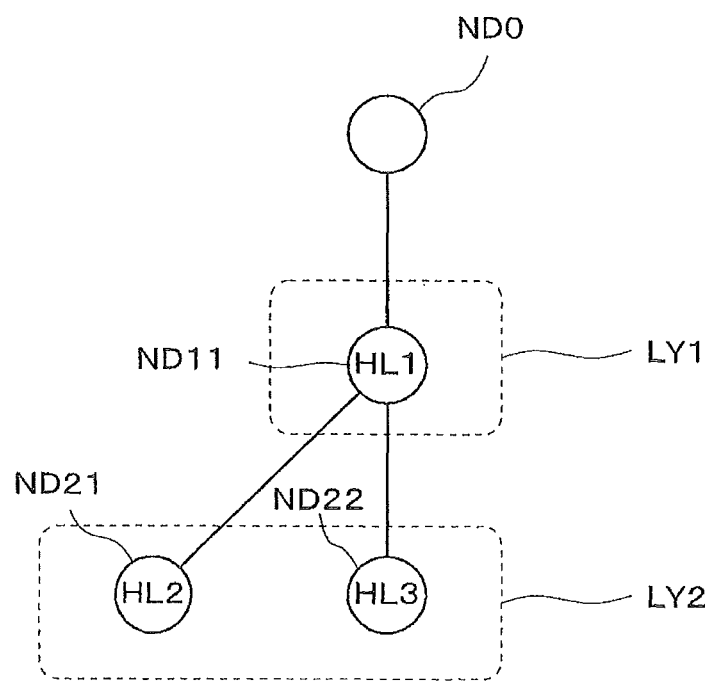
FIG. 25 is a view showing a tree structure relating to the updated manuscript.

Next, in Step S35, the node group setting part 12 hierarchizes the header item group HLi to thereby construct a tree structure TS2 (TS2a) as shown in FIG. 24. Specifically, the node group setting part 12 allocates the header item HL1 to the first level LY1 and allocates the header items HL2 and HL3 to the second level LY2. Further, the node group setting part 12 sets each of the header items to the corresponding node in the node group of the tree structure TS2 (TS2a) as shown in FIG. 25. In more detail, the node group setting part 12 sets the header item HL1 to the node ND11 in the first level LY1 and sets the header items HL2 and HL3 to nodes ND21 and ND22, respectively, in the second level LY2.

Figure 26:
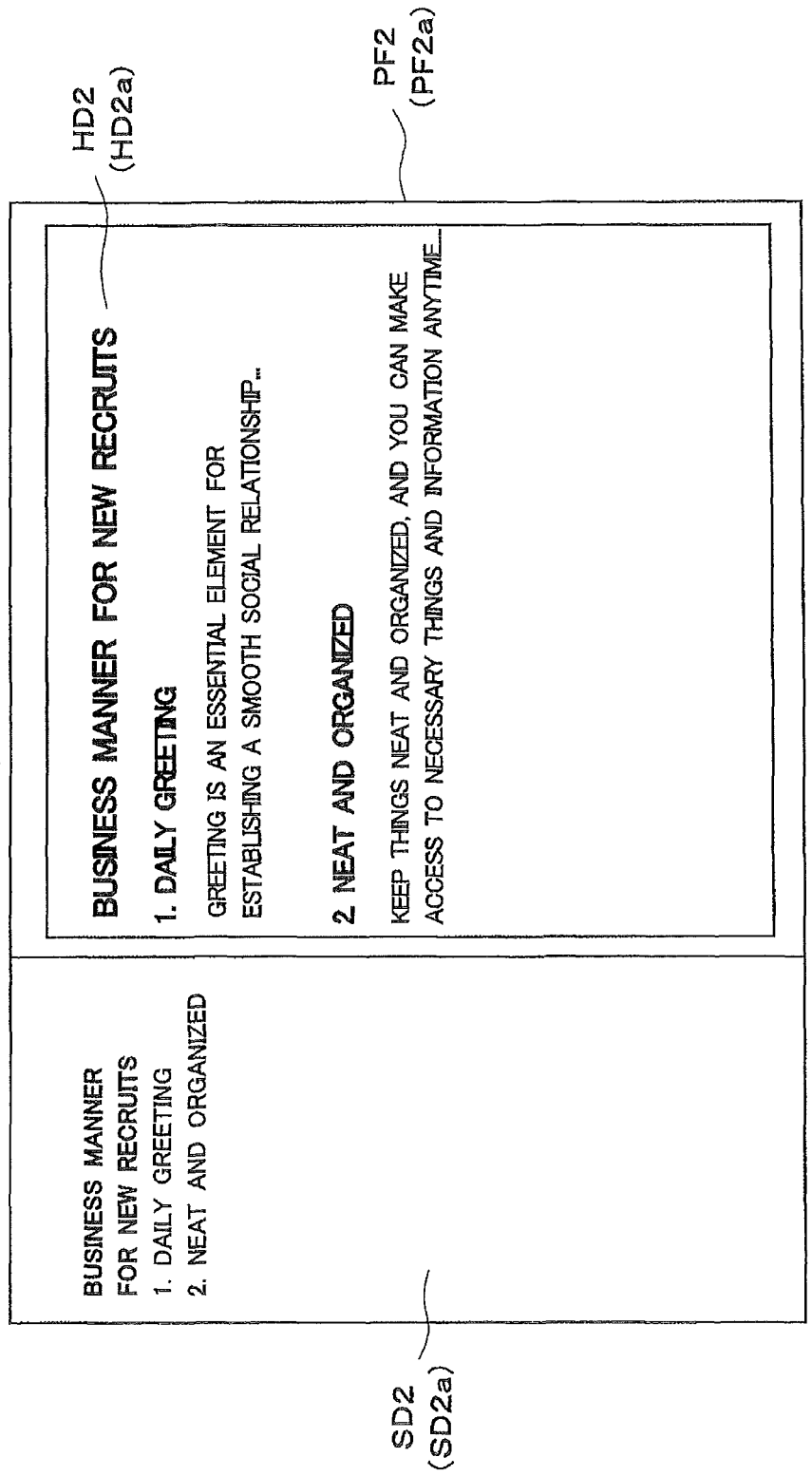
FIG. 26 is a view showing an electronic document of the updated manuscript.

In next Step S36, the electronic document generator 13 generates an electronic document PF2a as shown in FIG. 26. Herein, as the electronic document PF2a, adopted is a data file (e.g., a PDF file with bookmarks) in a format having a main body information area HI2a (not shown) and a bookmark information area SI2a (not shown).

Then, the electronic document generator 13 stores main body information generated on the basis of the image data GA2a into the main body information area H12a in the electronic document PF2a and stores index information generated on the basis of the header items HLi into the bookmark information area SI2a. If the electronic document PF2a is browsed, as shown in FIG. 26, the main body information is displayed in a main body display area HD2a of the electronic document PF2a and the index information (header items) is displayed in a bookmark display area SD2a of the electronic document PF2a.

The electronic document generator 13 further embeds information (link information) for linking the header items constituting the index information with the corresponding main body information into the electronic document PF2a. When the reader who reads the electronic document PF2a selects one of the header items displayed in the bookmark display area SD2a, the main body information corresponding to the selected header item can be thereby displayed in the main body display area HD2a.

Figure 27:
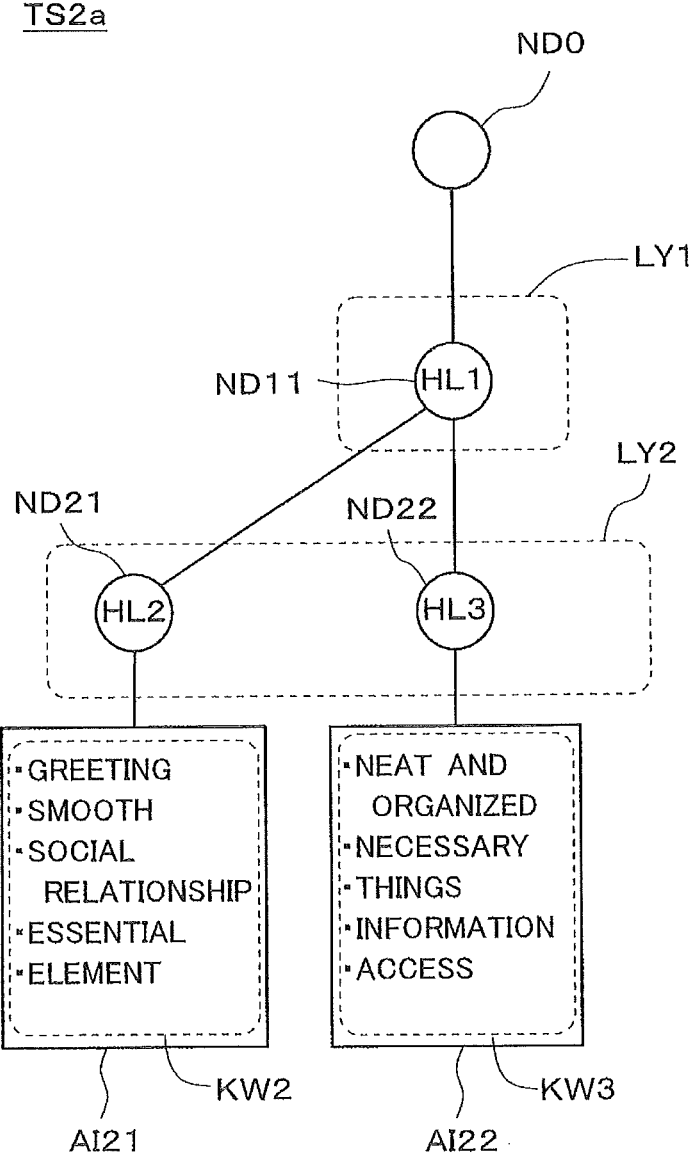
FIG. 27 is a view showing the tree structure with pieces of accompanying information.

Further, in Step S37, the accompanying information setting part 14 executes the process steps (Steps S71 to S76) in the flowchart of FIG. 4 to set accompanying information to each node in the tree structure. Specifically, as shown in FIG. 27, the accompanying information setting part 14 sets the keyword group KW2 as the accompanying information AI21 of the node ND21 in the tree structure TS2a and sets the keyword group KW3 as the accompanying information AI22 of the node ND22 in the tree structure TS2a.

Next, in Step S38, the updated portion detector 15 compares the tree structure TS1 relating to the original manuscript MS1 with the tree structure TS2a relating to the manuscript MS2a, to thereby detect updated portions in the manuscript MS2a. Further, in Step S38, the storage controller 16 stores the display information of the updated portions in the manuscript MS2a into the bookmark information area SI2 in the electronic document PF2a.

Specifically, process steps (Steps S51 to S64) in the flowchart of FIG. 5 are executed. FIG. 5 is a flowchart showing a detailed operation in Step S38.

Hereinafter, with reference to the flowchart of FIG. 5, discussion will be made on an operation of the updated portion detector 15 for detecting the updated portions and an operation of the storage controller 16 for storing the display information of the updated portions into the electronic document PF2a.

In Step S38 (FIG. 5), the header item set to each node in the node group of the tree structure TS2 (TS2a) is compared with the header item set to each node in the node group of the tree structure TS1 and the updated portions are thereby detected. In more detail, by comparing the header item set to the m-th node ND(2, n, m) in the n-th level of the tree structure TS2 with the header item set to each node (1, n, j) of a node group which is present in the same level (the n-th level) as the node ND(2, n, m) is present, out of the node group in the tree structure TS1, and the like operation (Steps S51 to S56 and S59 to S61), the updated portions are detected. The node ND(1, n, m) represents the m-th node in the n-th level of the tree structure TS1 and the node ND(2, n, m) represents the m-th node in the n-th level of the tree structure TS2.

First, in Step S51, the updated portion detector 15 selects a node (referred to also as a "specified node") to be compared, out of the node group in the tree structure TS2 (TS2a). Specifically, first, the first node ND11 (ND(2, 1, 1)) (m=1) in the first level LY1 (n=1) of the tree structure TS2a relating to the updated manuscript MS2a is selected.

Next, in the Step S52, the updated portion detector 15 compares the header item set to the m-th node ND(2, n, m) in the n-th level of the tree structure TS2 with the header item set to each node ND(1, n, j) in the n-th level of the tree structure TS1. Then, the updated portion detector 15 determines whether or not the header item for each node ND(1, n, j) coincides with the header item for the specified node ND(2, n, m). If there is a header item which coincides with the header item for the specified node, it is determined that the header item is not changed. The node ND(1, n, k) corresponding to the specified node ND(2, n, m) is recorded as a "corresponding node". After that, the process goes to Step S53. On the other hand, if there is no header item which coincides with the header item for the specified node, it is determined that the header item is changed and the process goes to Step S59. In Step S59, as discussed later, the specified node ND(2, n, m) is added to the header change item.

Herein, the header item HL1 set to the node ND11 (ND(2, 1, 1)) in the tree structure TS2a is compared with the header item set to the node ND(1, 1, j) in the first level LY1 of the tree structure TS1.

Figure 28:
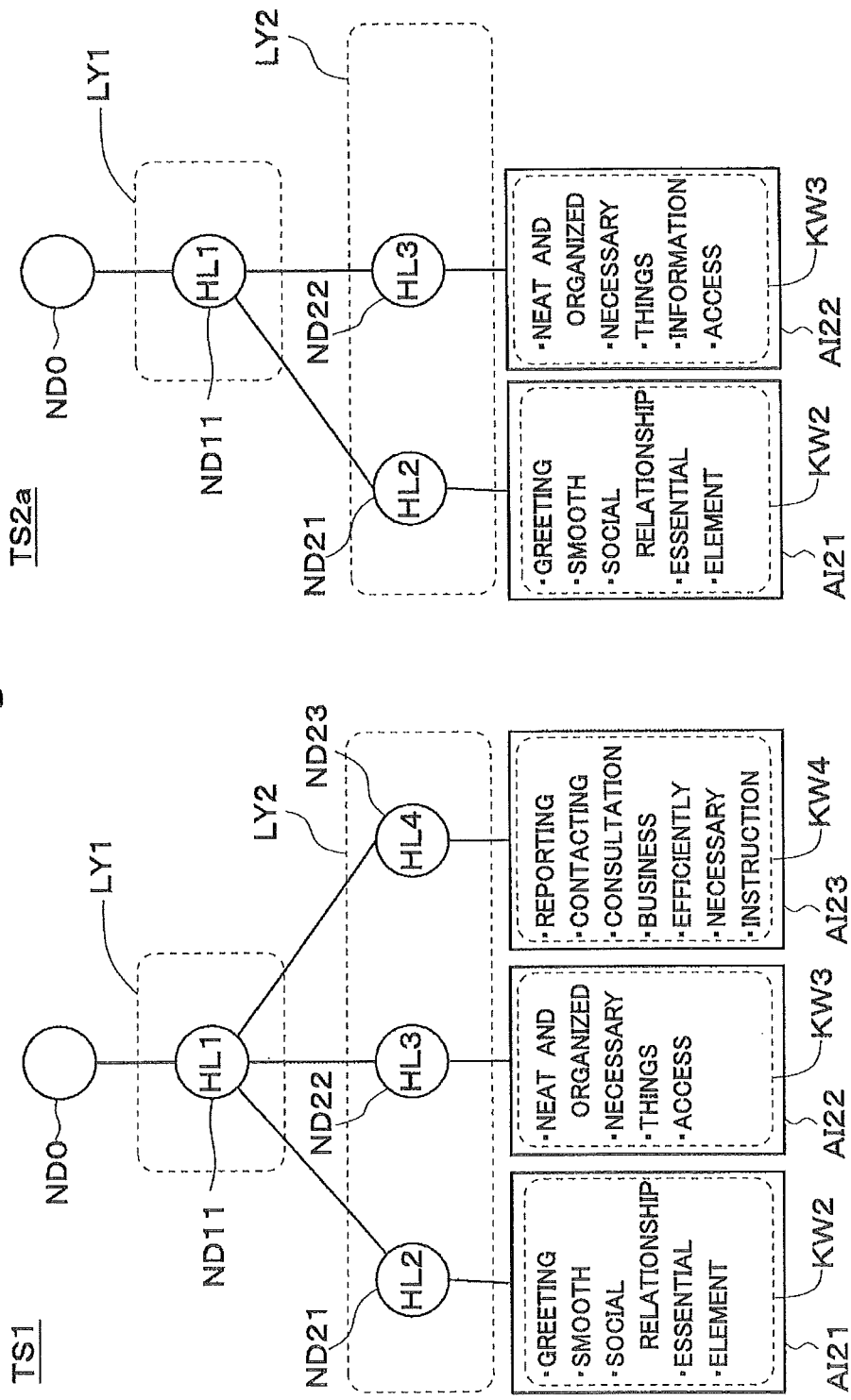
FIG. 28 is a view showing the tree structure relating to the original manuscript and the tree structure relating to the updated manuscript.

As shown in FIG. 28, the node ND11 is the only node which is present in the first level LY1 of the tree structure TS1. Therefore, the updated portion detector 15 compares the header item HL1 set to the node ND11 in the tree structure TS2a with the header item HL1 set to the node ND11 in the tree structure TS1. In this case, the header item HL1 set to the node ND11 in the tree structure TS2a is "Business Manner for New Recruits" as shown in FIG. 23. The header item HL1 set to the node ND11 in the tree structure TS1 is also "Business Manner for New Recruits" as shown in FIG. 8, and this is the same character string as that of the header item HL1 set to the node ND11 in the tree structure TS2a. Therefore, the updated portion detector 15 determines that the header item HL1 for the node ND11 in the tree structure TS2a coincides with the header item HL1 for the node ND11 in the tree structure TS1 and also determines that the header item HL1 is not changed. After that, the process goes to Step S53.

In Step S53, the updated portion detector 15 determines whether or not there is accompanying information of each of the nodes which are determined to be coincident in Step S52. If there is accompanying information, the process goes to Step S54. If there is no accompanying information, the process goes to Step S56. In Step S54, as discussed later, performed is an operation for determining whether the keyword group is coincident or not.

In this case, there is no accompanying information set to the node ND11 in the tree structure TS2a nor the node ND11 in the tree structure TS1 as shown in FIG. 28. Therefore, the updated portion detector 15 determines that the coincident nodes have no accompanying information, and the process goes to Step S56.

In Step S56, the updated portion detector 15 determines whether or not there remains any node ND(2, n, m) in the n-th level of the tree structure TS2a which has not been compared. If there remains any node which has not been compared, the process goes to Step S61, and then the value m is incremented to update the specified node and the process goes back to Step S52. On the other hand, if there remains no other node which has not been compared, the process goes to Step S57.

As shown in FIG. 28, there is no node other than the node ND11 in the first level LY1 of the tree structure TS2a. Therefore, the updated portion detector 15 determines that there remains no node which has not been compared in the first level LY1 of the tree structure TS2a, and the process goes to Step S57.

In Step S57, the updated portion detector 15 determines whether or not there is any non-corresponding node ND(1, n, j) in the n-th level of the tree structure TS1. The "non-corresponding node" refers to any node other than the "corresponding node" (discussed above) (see Step S52) among all the nodes present in the same level of the tree structure TS1. In other words, the "non-corresponding node" refers to a node of which the header item does not coincide with that of any node in the n-th level of the tree structure TS2a. If there is any non-corresponding node, the process goes to Step S62, and it is determined that the non-corresponding node is deleted, corrected, or so on and the header item set to the non-corresponding node is added to the "header change item". On the other hand, if there no non-corresponding node, the process goes to Step S58 from Step S57. The "header change item" refers to a header item of which the name is different between before and after the update of the manuscript. In more detail, the "header change item" includes a header item of which the name is corrected in the update of the manuscript, a header item which is deleted in the update of the manuscript, and a header item which is added in the update of the manuscript.

The only node ND11 in the first level of the tree structure TS1 corresponds to the node ND11 in the first level of the tree structure TS2a. Therefore, the updated portion detector 15 determines that there is no non-corresponding node ND(1, 1, j) in the first level of the tree structure TS1. Then, the process goes to Step S58.

In Step S58, the updated portion detector 15 determines whether or not there is any level lower than the n-th level in the tree structure TS2a. If there is a lower level, the process goes to Step S63. If there is no lower level, the operation of the flowchart in FIG. 5 is completed and the process goes to Step S39 in FIG. 3.

In this case, as shown in FIG. 28, the tree structure TS2a has the second level LY2 which is lower than the first level LY1. Therefore, it is determined that there is a level lower than the first level LY1 in the tree structure TS2a, and the process goes to Step S63.

In Step S63, the value n is incremented and the value m is reset to "1", and the specified node is thereby updated. In more detail, the updated portion detector 15 sets the first node ND21 (m=1) in the second level LY2 (n=2) of the tree structure TS2a relating to the manuscript MS2a as the specified node. Then, the process goes back to Step S52.

In Step S52, the updated portion detector 15 compares the header item set to the first node ND(2, 2, 1) in the second level of the tree structure TS2a with the header item set to each node ND(1, 2, j) in the second level of the tree structure TS1 this time. In more detail, the updated portion detector 15 compares the header item HL2 set to the node ND21 in the tree structure TS2*a* with the respective header items set to the nodes ND21, ND22, and ND23 in the second level LY2 of the tree structure TS1 and determines whether or not there is any header item which coincides with the header item HL2 in the tree structure TS2*a*.

As shown in FIG. 23, the header item HL2 set to the node ND21 in the tree structure TS2*a* is "1. Daily Greeting". The header items HL2, HL3, and HL4 set to the nodes ND21, ND22, and ND23 in the tree structure TS1 are "1. Greeting", "2. Neat and Organized", and "3. Reporting, Contacting, and Consultation", respectively, as shown in FIG. 8. Therefore, the updated portion detector 15 determines that the header item HL2 set to the node ND21 in the tree structure TS2*a* does not coincide with any one of the respective header items HL2, HL3, and HL4 set to the nodes ND21, ND22, and ND23 in the tree structure TS1. Then, the updated portion detector 15 detects the header item HL2 set to the node ND21 in the tree structure TS2*a* as an updated portion. Then, the process goes to Step S59.

Figure 29:
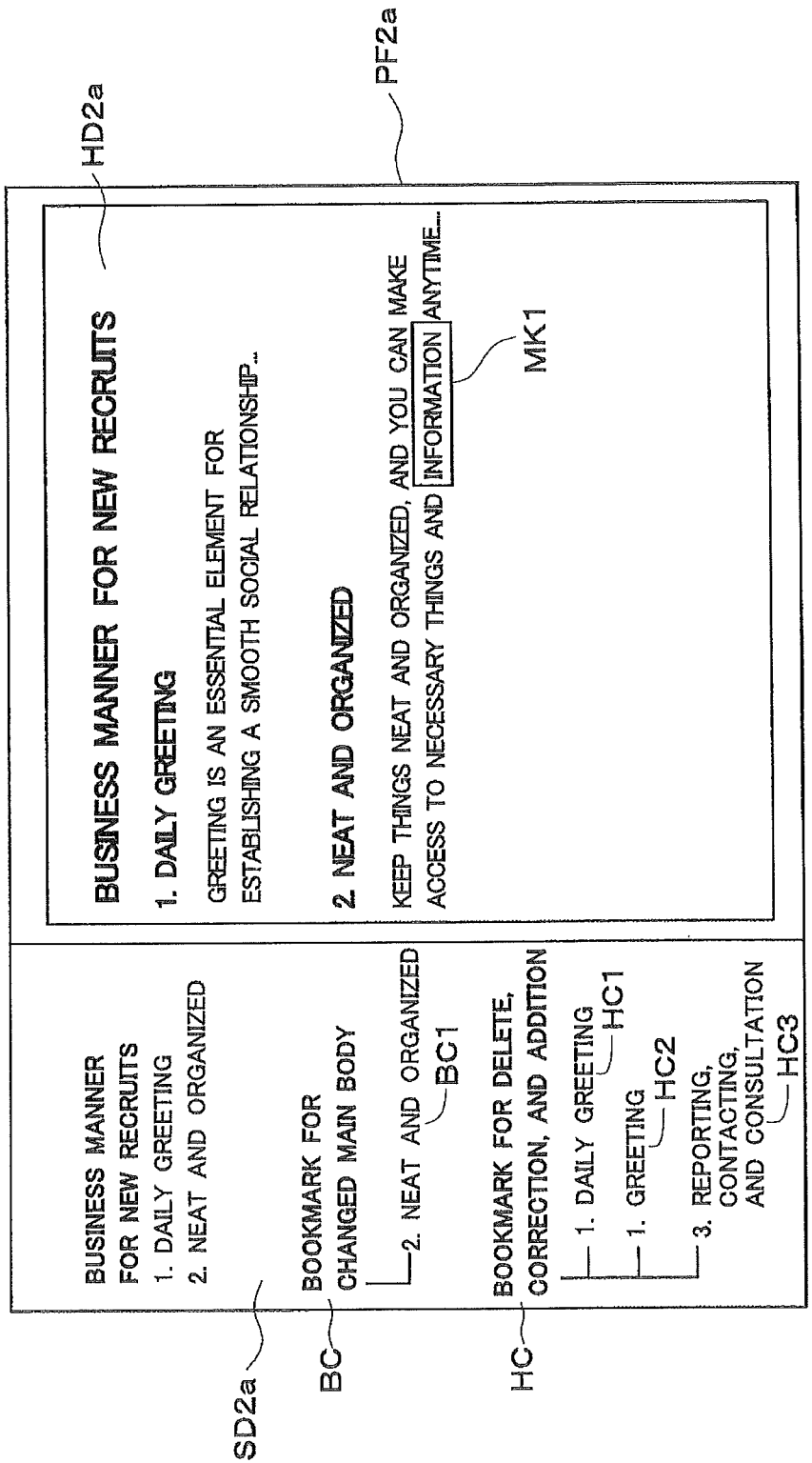
FIG. 29 is a view showing an electronic document of the updated manuscript.

In Step S59, the specified node ND(2, n, m) is added to the updated portion (header change item). Then, the storage controller 16 stores the display information of this updated portion into the bookmark information area SI2*a* in the electronic document PF2*a*. As a result, as shown in FIG. 29, the header item HL2 set to the node ND21 (ND(2, 2, 1)) in the tree structure TS2*a* is additionally displayed as a header change item HC1 in the bookmark display area SD2*a* of the electronic document PF2*a*, as can be clearly seen from comparison with FIG. 26.

In Step S56, the updated portion detector 15 determines whether or not there is any node other than the node ND21 in the second level LY2 of the tree structure TS2*a*.

In this case, as shown in FIG. 28, the node ND22 other than the node ND21 is also present in the second level LY2 of the tree structure TS2*a*. Therefore, the updated portion detector 15 determines that there is another node in the second level LY2 of the tree structure TS2*a*, and the process goes to Step S61.

In Step S61, the value m is incremented to update the specified node. In more detail, the updated portion detector 15 sets the second node ND22 (ND(2, 2, 2)) (m=2) in the second level LY2 (n=2) of the tree structure TS2*a* relating to the updated manuscript MS2*a* as the specified node. Then, the process goes back to Step S52.

In Step S52, the updated portion detector 15 compares the header item HL3 set to the node ND22 (ND(2, 2, 2)) in the tree structure TS2*a* with the header item set to each node ND(1, 2, j) in the second level LY2 of the tree structure TS1.

As shown in FIG. 28, three nodes ND21, ND22, and ND23 are present in the second level LY2 of the tree structure TS1. Then, the updated portion detector 15 detects that the header item HL3 ("2. Neat and Organized") set to the node ND22 in the tree structure TS2*a* coincides with the header item HL3 ("2. Neat and Organized") set to the node ND22 in the tree structure TS1, and the process goes to Step S53.

In Step S53, the updated portion detector 15 determines whether or not there are respective accompanying information for the node ND22 in the tree structure TS2*a* and the node ND22 in the tree structure TS1.

As shown in FIG. 28, the accompanying information AI22 is set to the node ND22 in the tree structure TS2*a* and the accompanying information AI22 is set to the node ND22 in the tree structure TS1. Therefore, the updated portion detector 15 determines that the accompanying information for both the nodes are present, and the process goes to Step S54.

In Step S54, the accompanying information set to the node ND22 in the node group of the tree structure TS2*a* is compared with the accompanying information set to the corresponding node ND22 in the node group of the tree structure TS1 and an updated portion (in more detail, a main body change item) is thereby detected.

In more detail, the updated portion detector 15 determines whether or not all the keywords in the keyword group KW3 which is the accompanying information AI22 set to the node ND22 in the tree structure TS2*a* coincide with all the keywords in the keyword group KW3 which is the accompanying information AI22 set to the node ND22 in the tree structure TS1. If all the keywords are coincident, the process goes to Step S56. If there is any keyword which is not coincident, the process goes to Step S60.

As shown in FIG. 28, a new keyword "information" is added to the accompanying information AI22 (i.e., the keyword group KW3) set to the node ND22 in the tree structure TS2*a*. The updated portion detector 15 determines that the accompanying information AI22 (i.e., the keyword group KW3) set to the node ND22 in the tree structure TS2*a* does not completely coincide with the accompanying information AI22 (i.e., the keyword group KW3) set to the node ND22 in the tree structure TS1. Then, the updated portion detector 15 detects the header item HL3 set to the node ND22 in the tree structure TS2*a* as an updated portion (in more detail, a main body change item), and the process goes to Step S60. The "main body change item" refers to a header item of which the accompanying information (in more detail, the text information (main body) accompanying the header item) is changed.

In Step S60, the storage controller 16 stores the display information of the updated portion into the bookmark information area SI2*a*. As a result, as shown in FIG. 29, the header item HL3 set to the node ND22 in the tree structure TS2*a* is displayed as a main body change item BC1 in the bookmark display area SD2*a*.

Further, in Step S60, the storage controller 16 embeds information (link information) for linking the main body change item BC1 with the corresponding main body information into the bookmark information area SI2*a* of the electronic document PF2*a*. When the reader who reads the electronic document PF2*a* selects the main body change item BC1 displayed in the bookmark display area SD2*a*, the main body information corresponding to the selected main body change item BC1 can be displayed in the main body display area HD2*a* by using the link information. In short, a "jump display" is performed in response to the selection of the main body change item BC1.

Furthermore, in Step S60, the storage controller 16 stores marking information into the main body information area HI2*a*. In the main body display area HD2*a* of the electronic document PF2*a*, the keyword "information" to be marked is displayed with a marker MK1 as shown in FIG. 29.

In next Step S56, the updated portion detector 15 determines whether or not there is any node other than the nodes ND21 and ND22 in the second level LY2 of the tree structure TS2*a*.

As shown in FIG. 28, there is no node other than the nodes ND21 and ND22 in the second level LY2 of the tree structure TS2*a*. Therefore, the updated portion detector 15 determines that there is no other node in the second level LY2 of the tree structure TS2*a*, and the process goes to Step S57.

In Step S57, the updated portion detector 15 determines whether or not there is any non-corresponding node ND(1, 2, j) in the second level of the tree structure TS1.

There is no node in the second level LY2 of the tree structure TS2*a*, which coincides with any one of the two nodes ND21 and ND23 among the three nodes in the second level LY2 of the tree structure TS1. Therefore, the updated portion detector 15 detects the header items HL2 and HL4 set to the non-corresponding nodes ND21 and ND23, respectively, in the tree structure TS1 as updated portions (in more detail, the header change items). Then, the process goes to Step S62.

In Step S62, the non-corresponding nodes ND21 and ND23 are added to the updated portion (header change item). Then, the storage controller 16 stores the display information of these updated portions into the bookmark information area SI2a in the electronic document PF2a. As a result, as shown in FIG. 29, the header item HL2 set to the node ND21 in the tree structure TS1 is displayed as a header change item HC2 and the header item HL4 set to the node ND23 in the tree structure TS1 is displayed as a header change item HC3 in the bookmark display area SD2a of the electronic document PF2a.

In Step S58, the updated portion detector 15 determines whether or not there is any level lower than the second level LY2 in the tree structure TS2a.

As shown in FIG. 28, there is no level lower than the second level LY2 in the tree structure TS2a. Therefore, the updated portion detector 15 determines that there is no level lower than the second level LY2 in the tree structure TS2a. Then, the operation of the flowchart in FIG. 5 is completed and the process goes to Step S39 in FIG. 3.

In Step S39, the communication part 4 sends the electronic document PF2a after being subjected to the processing of Step S38 to a predetermined destination. The electronic document PF2a is sent to, for example, a "destination address" in the sending record SR1.

Next, in Step S40, the job history recorder 17 associates a sending record SR2 of a sending job for sending the electronic document PF2a with the tree structure TS2a relating to the electronic document PF2a and records the sending record SR2 associated with the tree structure TS2a. In more detail, as shown in FIG. 30, for example, the job history recorder 17 writes the history information on the electronic document PF2a into the sending record SR2. Then, the job history recorder 17 associates the tree structure (hierarchized text information) TS2a relating to the electronic document PF2a with the sending record SR2 and records the sending record SR2 associated with the tree structure TS2a. In a case where the manuscript is further updated, the sending record SR2 is used for detecting the difference between a further updated manuscript and the manuscript immediately before the further update (i.e., the manuscript relating to the sending record SR2).

In the above-discussed operation, the updated portion detector 15 detects the updated portions in the updated manuscript MS2 by comparing the tree structure TS1 relating to the original manuscript MS1 with the tree structure TS2 relating to the updated manuscript MS2. The storage controller 16 stores the display information of the updated portions in the updated manuscript MS2 into the bookmark information area SI2 in the electronic document PF2. When the electronic document PF2a is browsed, as shown in FIG. 29, the main body information is displayed in the main body display area HD2a of the electronic document PF2a and the index information (header items) is displayed in the bookmark display area SD2a of the electronic document PF2a. Especially, since the updated portions are displayed in the bookmark display area SD2a of the electronic document PF2a on the basis of the display data of the updated portions, the reader who reads the electronic document PF2 (a recipient of the electronic document PF2, or the like) can easily recognize (check) the updated portions in the manuscript MS2 by reading only this electronic document PF2.

More especially, since the updated portions are detected by comparing the header items set to the node group in the tree structure TS2 with the header items set to the node group in the tree structure TS1, it is possible to efficiently detect the updated portions in a rough manner (for example, detect only the updated portions of the header items) as compared with the case where all the text information in both the tree structures are compared.

Further, especially, since one header item set to one node (ND(2, n, m)) in the tree structure TS2 is compared with the header item set to each of the nodes (ND(1, n, j)) which are present in the same level as the node (ND(2, n, m)) is present, among the node group in the tree structure TS1, more efficient comparison can be performed as compared with the ease where one node in the tree structure TS2 is compared with each of all the nodes in all the levels of the tree structure TS1 (regardless of the level).

Especially, since the accompanying information set to each of the nodes in the node group of the tree structure TS2 is compared with the accompanying information set to each of the nodes in the node group of the tree structure TS1, it is possible to also detect the updated portion of the main body other than the header item, as the updated portion (the main body change item or the like) in the updated manuscript in detail.

More especially, since the text information TX1 recorded being associated with the specified reading job is acquired as the text information to be compared (the text information of the original manuscript) in Step S31, it is not necessary to generate again the text information TX1 even when the updated manuscript is compared with the original manuscript after some time elapsed from the end of the scan job of the original manuscript, or the like.

<5. Another Update Operation>

Discussion has been made above on the case where the original manuscript MS1 (shown in FIG. 6) and the updated manuscript MS2a (shown in FIG. 20) are scanned and sent.

Hereinafter, another example of update will be discussed. Specifically, discussion will be made on a case where the original manuscript MS1 (shown in FIG. 6) and an updated manuscript MS2b (shown in FIG. 31) are scanned and sent, centering on the difference from the above-discussed case.

As shown in FIG. 32, the updated manuscript MS2b is a manuscript in which one portion (updated portion UD1b) in the original manuscript MS1 (in FIG. 6) is updated. Specifically, as the updated portion UD1b, a header item "4. Telephone Manner" and the following main body sentences are added to the original manuscript MS1.

Figure 39:
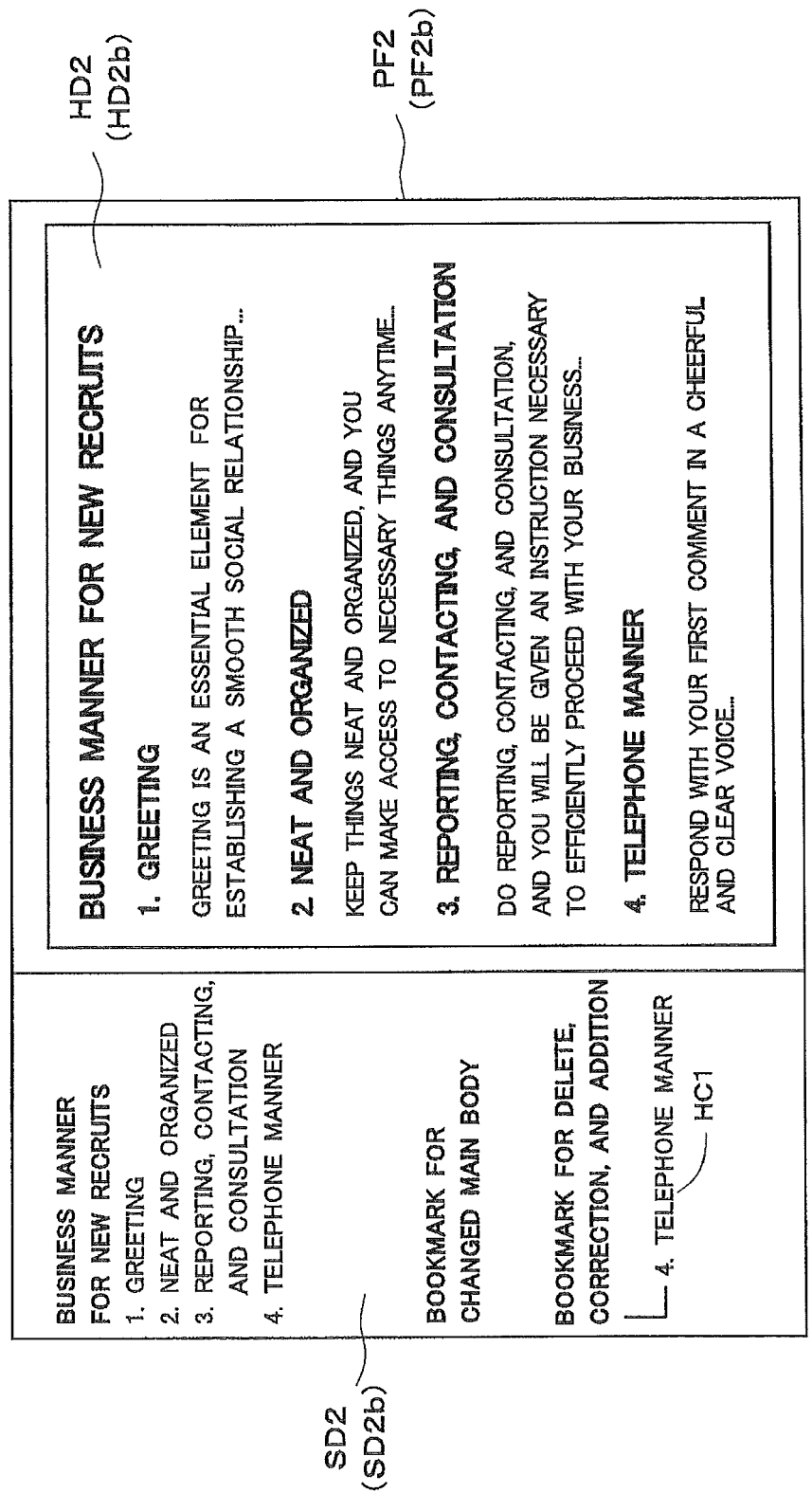
FIG. 39 is a view showing an electronic document of the updated manuscript.

By executing the operation in the flowchart of FIG. 3 for the updated manuscript MS2b, an electronic document PF2b shown in FIG. 39 is generated.

Figure 33:
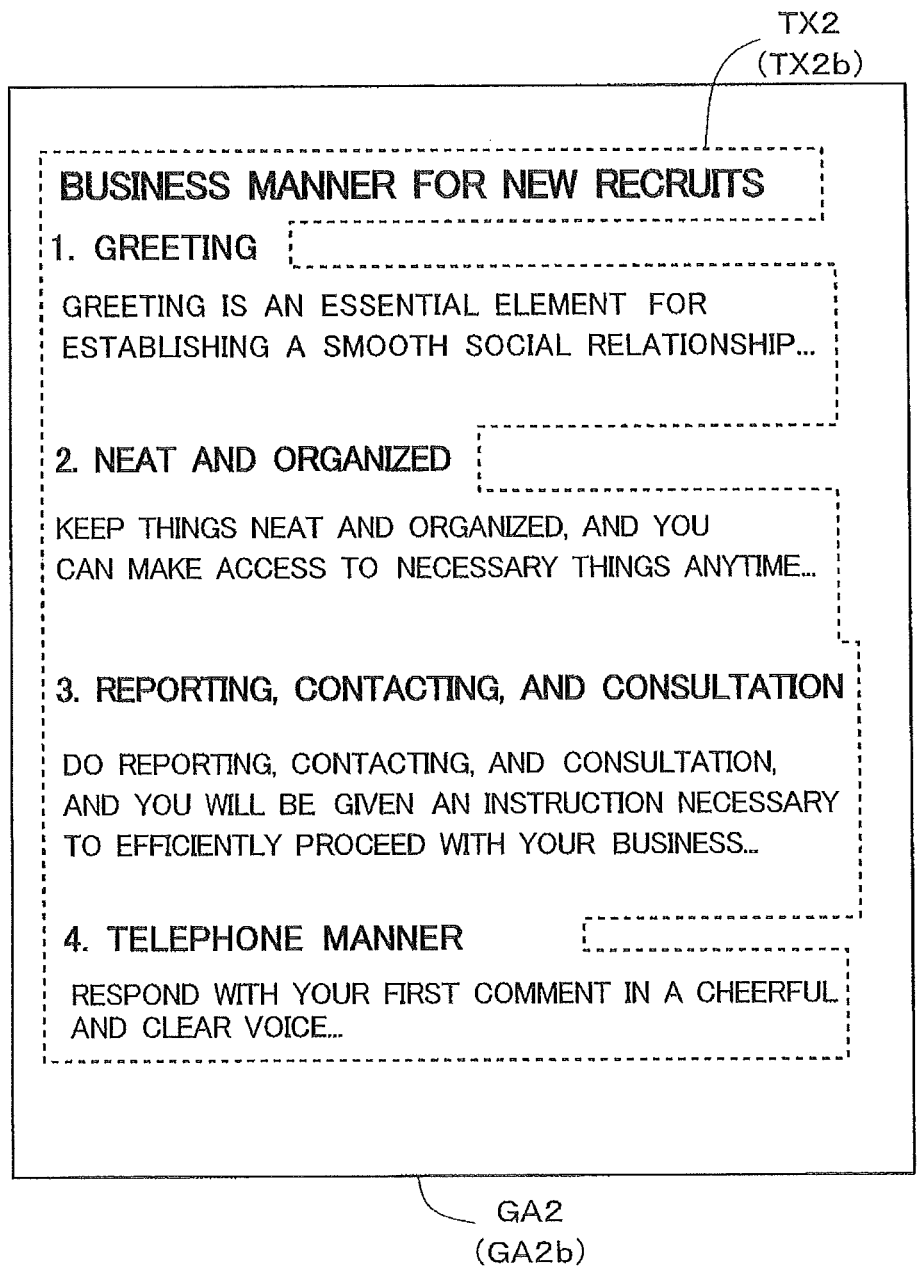
FIG. 33 is a view showing image data and text information of the updated manuscript.

Specifically, after the same operation in Step S31 as discussed above, in Step S32, the image reader 2 generates scan image data GA2 (GA2b) of the updated manuscript MS2b (see FIG. 33).

Then, in Step S33, the text information extraction part 10 extracts text information TX2 (TX2b) from the image data GA2b as shown in FIG. 33.

Figure 34:
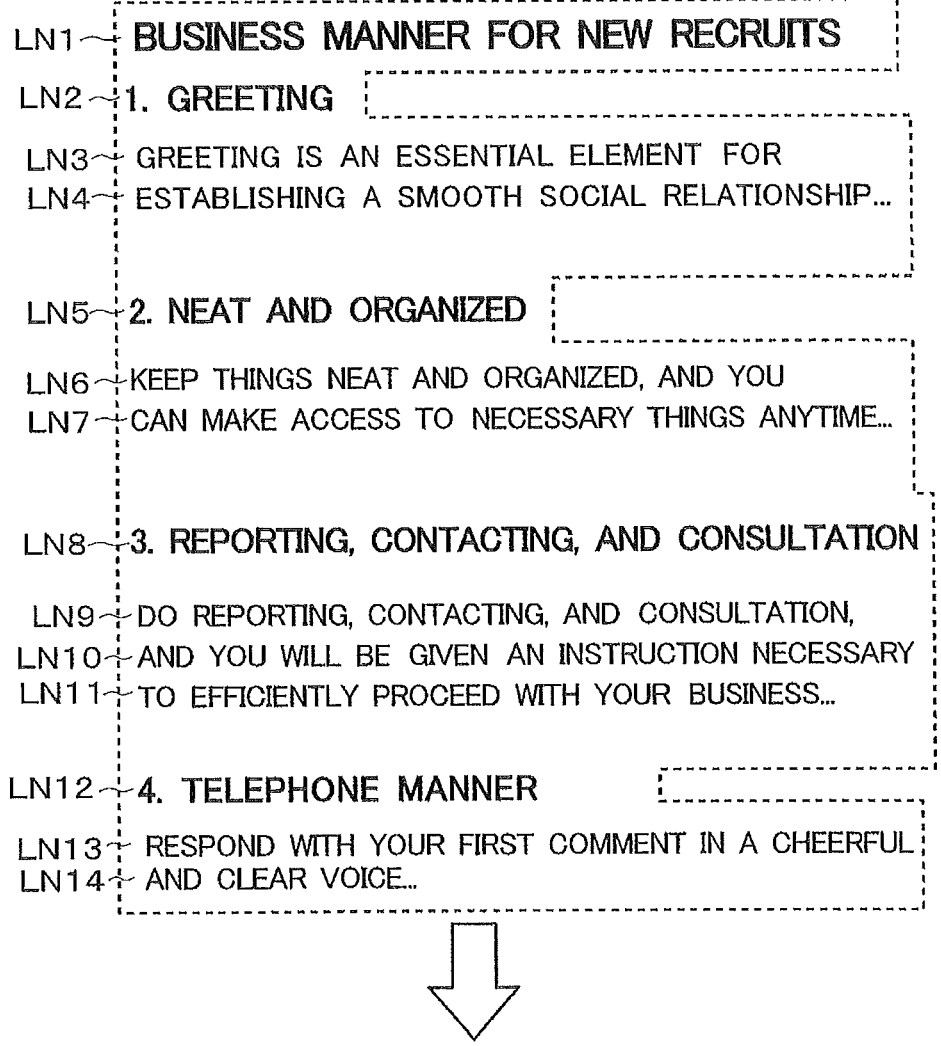
FIG. 34 is a view showing header items of the updated manuscript.

Further, in Step S34, the header item group extraction part 11 extracts a plurality of header items (line information LN1, LN2, LN5, LN8, and LN12) from the text information TX2b as header item group HLi (HL1, HL2, HL3, HL4, and HL5) as shown in FIG. 34.

Figure 35:
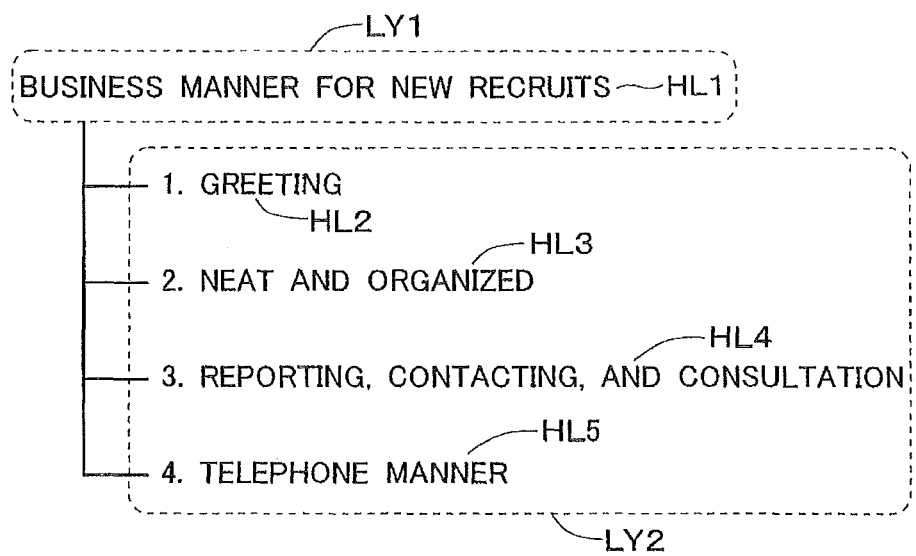
FIG. 35 is a view showing the hierarchized header items of the updated manuscript.
Figure 36:
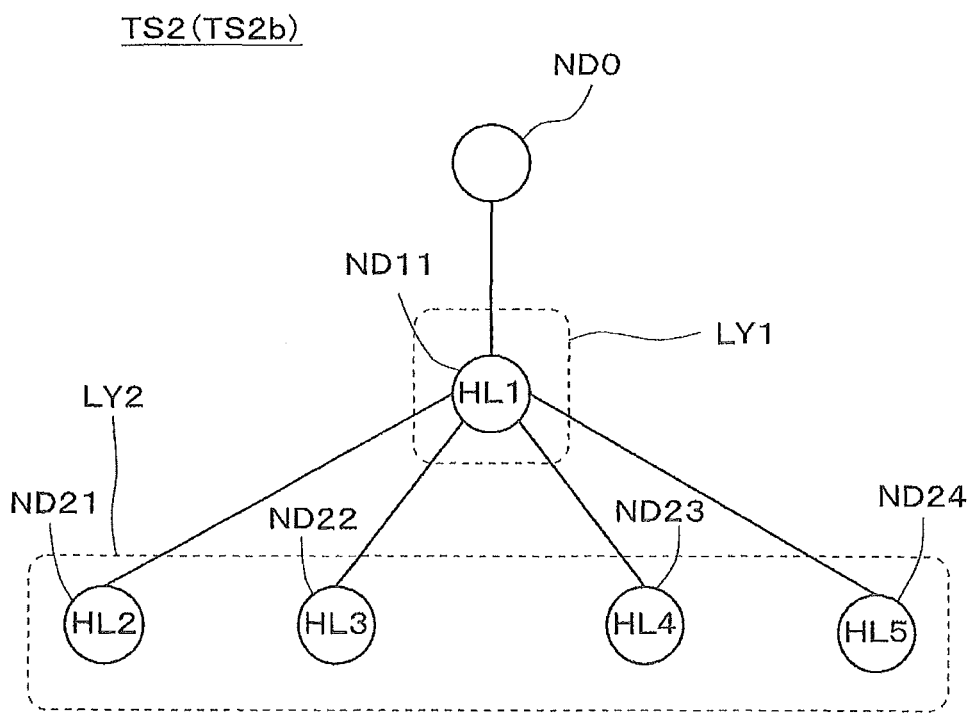
FIG. 36 is a view showing a tree structure relating to the updated manuscript.

Next, in Step S35, the node group setting part 12 hierarchizes the header item group HLi to thereby construct a tree structure TS2 (TS2b) as shown in FIG. 35. Specifically, the node group setting part 12 allocates the header item HL1 to the first level LY1 and allocates the header items HL2, HL3, HL4, and HL5 to the second level LY2. Further, the node group setting part 12 sets each of the header items to the corresponding node in the tree structure TS2 (TS2*b*) as shown in FIG. 36. Specifically, the node group setting part 12 sets the header item HL1 to the node ND11 in the first level LY1 and sets the header items HL2, HL3, HL4, and HL5 to nodes ND21, ND22, ND23, and ND24, respectively, in the second level LY2.

Figure 37:
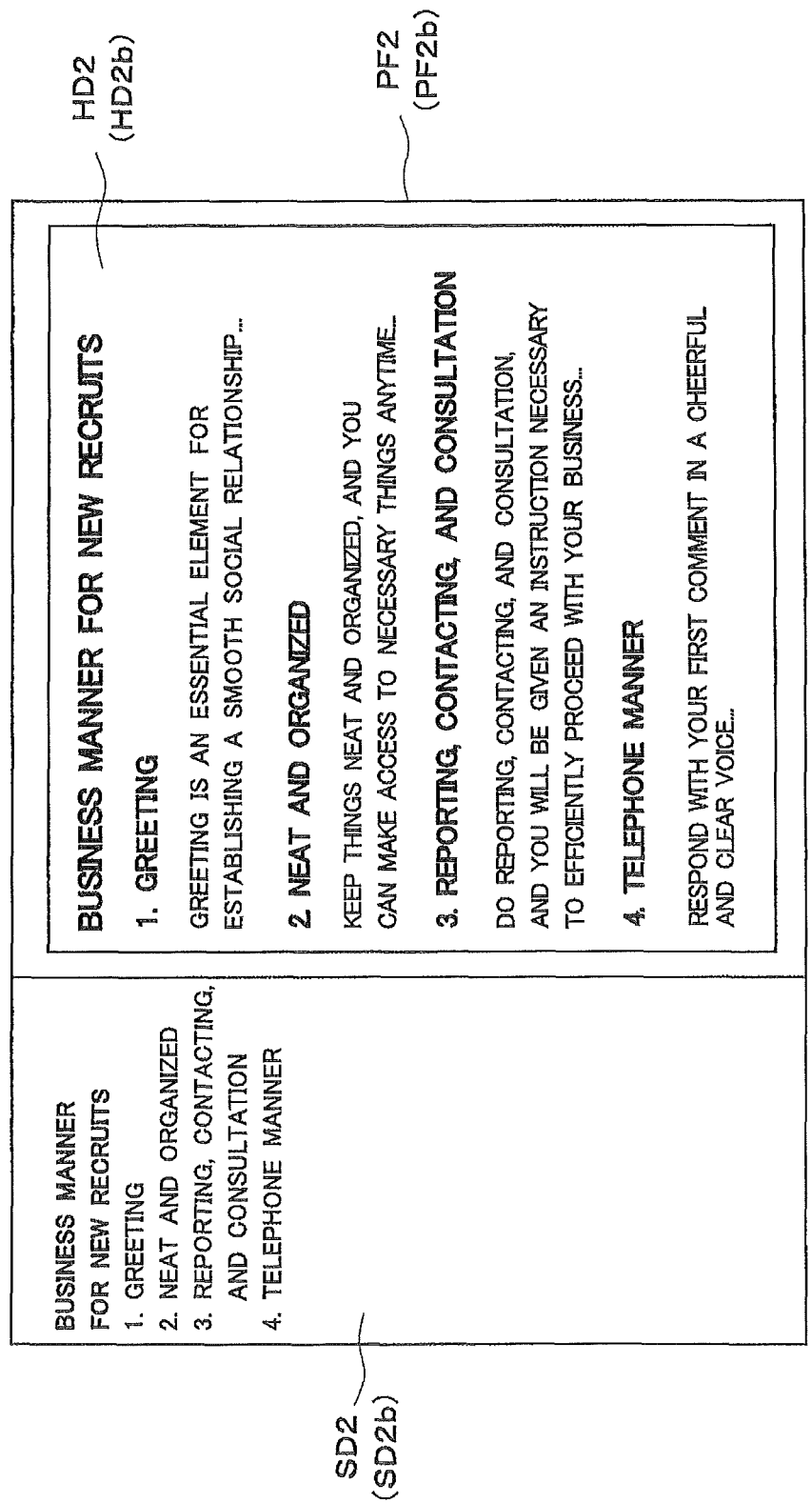
FIG. 37 is a view showing an electronic document of the updated manuscript.

In next Step S36, the electronic document generator 13 generates an electronic document PF2*b* as shown in FIG. 37. Especially, the electronic document generator 13 stores main body information generated on the basis of the image data GA2*b* into a main body information area HI2*b* and stores index information generated on the basis of the header items HLi into a bookmark information area SI2*b*.

Figure 38:
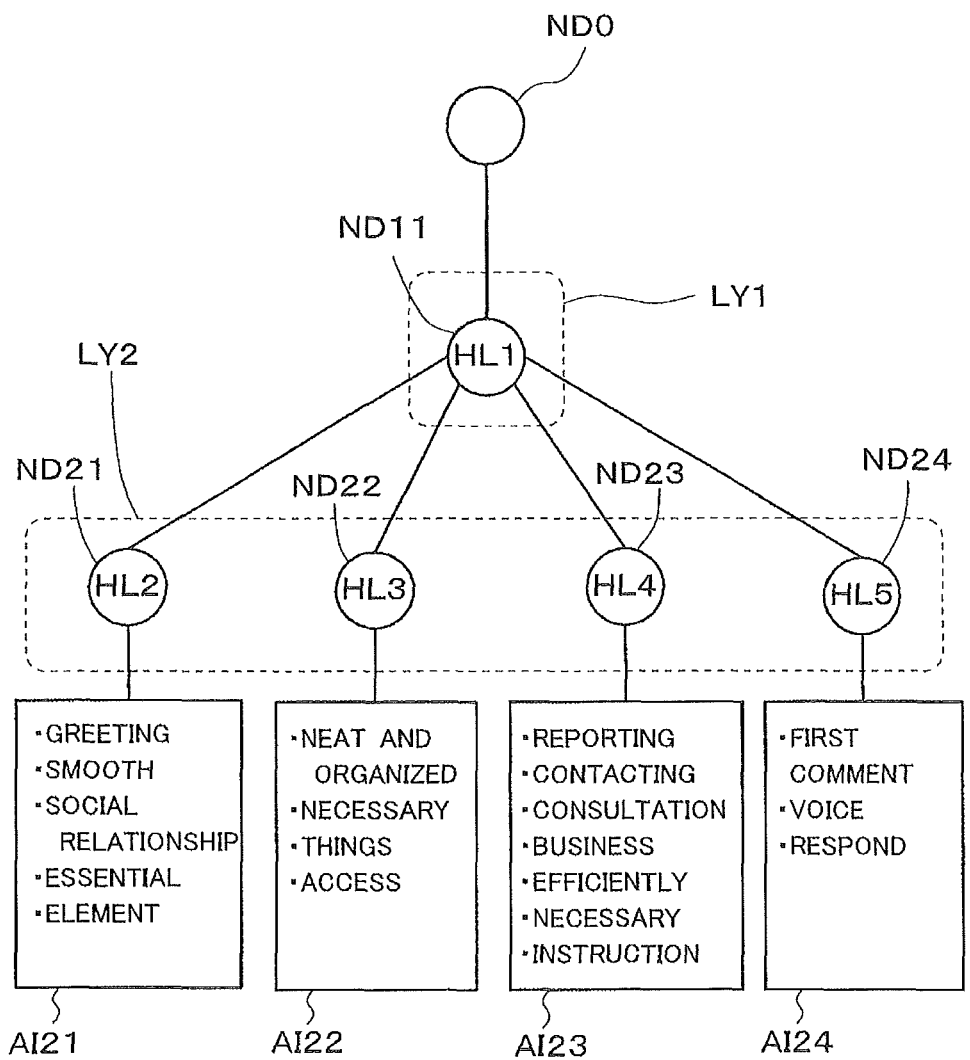
FIG. 38 is a view showing the tree structure with pieces of accompanying information.

Further, in Step S37, the accompanying information setting part 14 sets accompanying information AI21, AI22, AI23, and AI24 to the nodes ND21, ND22, ND23, and ND24, respectively, in the tree structure TS2 (TS2*b*) as shown in FIG. 38.

Next, in Step S38, the updated portion detector 15 compares the tree structure TS1 relating to the original manuscript MS1 with the tree structure TS2*b* relating to the updated manuscript MS2*b*, to thereby detect updated portions in the manuscript. MS2*b*. Further, in Step S38, the storage controller 16 stores the display information of the updated portions in the manuscript MS2*b* into the bookmark information area SI2*b* in the electronic document PF2*b*.

In detail, the updated portion detector 15 detects the header item HL5 set to the node ND24 in the tree structure TS2*b* as an updated portion. In more detail, in Step S52 (FIG. 5), the updated portion detector 15 determines that no one out of the header items HL2, HL3, and HL4 set to the nodes ND21, ND22, and ND23, respectively, in the second level LY2 of the tree structure TS1 coincides with the header item HL5 set to the node ND24 in the tree structure TS2*b*. Then, the updated portion detector 15 detects the header item HL5 set to the node ND24 in the tree structure TS2*b* as the updated portion.

Further, in Step S59, the storage controller 16 stores the display information of the updated portion into the bookmark information area SI2*b* in the electronic document PF2*b*. With this operation, the header item HL5 set to the node ND24 in the tree structure TS2*b* is displayed as a header change item HC1 in a bookmark display area SD2*b* of the electronic document PF2*b* as shown in FIG. 39.

After that, in Step S39, the communication part 4 sends the electronic document PF2*b* to a predetermined destination.

Further, in Step S40, the job history recorder 17 associates a sending record SR2 of a sending job for sending the electronic document PF2*b* with the tree structure TS2*b* relating to the electronic document PF2*b* and records the sending record SR2 associated with the tree structure TS2*b*.

Thus, in the MFP 1 of this preferred embodiment, the updated portion detector 15 compares the tree structure TS1 relating to the original manuscript MS1 with the tree structure TS2*b* relating to the updated manuscript MS2*b*, to thereby detect the updated portion in the updated manuscript MS2*b*. Then, the storage controller 16 stores the display information of the updated portion in the updated manuscript MS2*b* into the bookmark information area SI2 in the electronic document PF2. With this operation, since the updated portion is displayed in the bookmark display area SD2*b* of the electronic document PF2*b* on the basis of the display information of the updated portion, the reader who reads the electronic document PF2*b* can easily recognize (check) the updated portion in the manuscript MS2*b* by reading only this electronic document PF2*b*.

<6. Variations>

Though the preferred embodiment of the present invention has been discussed above, the present invention is not limited to the above-discussed preferred embodiment, but allows various variations.

Though the case where the updated portion detector 15 compares the tree structure TS1 relating to the original manuscript MS1 with the tree structure TS2 relating to the updated manuscript MS2 to thereby detect the updated portions in the updated manuscript MS2 (see FIG. 5) has been discussed in the above preferred embodiment, this is only one exemplary case. Specifically, the updated portion detector 15 may compare the text information TX1 (see FIG. 7) of the original manuscript MS1 with the text information TX2 (see FIGS. 22 and 34) of the updated manuscript MS2, without hierarchization, to thereby detect the updated portions in the manuscript MS2.

Though the case where the job history recorder 17 records the sending record of a sending job for the electronic document, which is associated with the text information (in detail, the tree structure) of the electronic document, has been discussed in the above preferred embodiment (see Step S18 in FIG. 2 and Step S40 in FIG. 3), this is only one exemplary case. For example, the job history recorder 17 may associate a storing record of an electronic document storing job (referred to also as "scan to box") for storing an electronic document generated by scanning into a folder (referred to also as a "box") in the data storage part 5 of the MFP 1 with the text information (the tree structure or the like) of the electronic document and record the storing record associated with the text information. Then, the comparison object specifying part 18 specifies the original electronic document to be compared with the electronic document after the update, from the records on storing of the electronic documents in the box in response to the operator's selection, and the updated portion detector 15 detects the updated portion.

Figure 40:
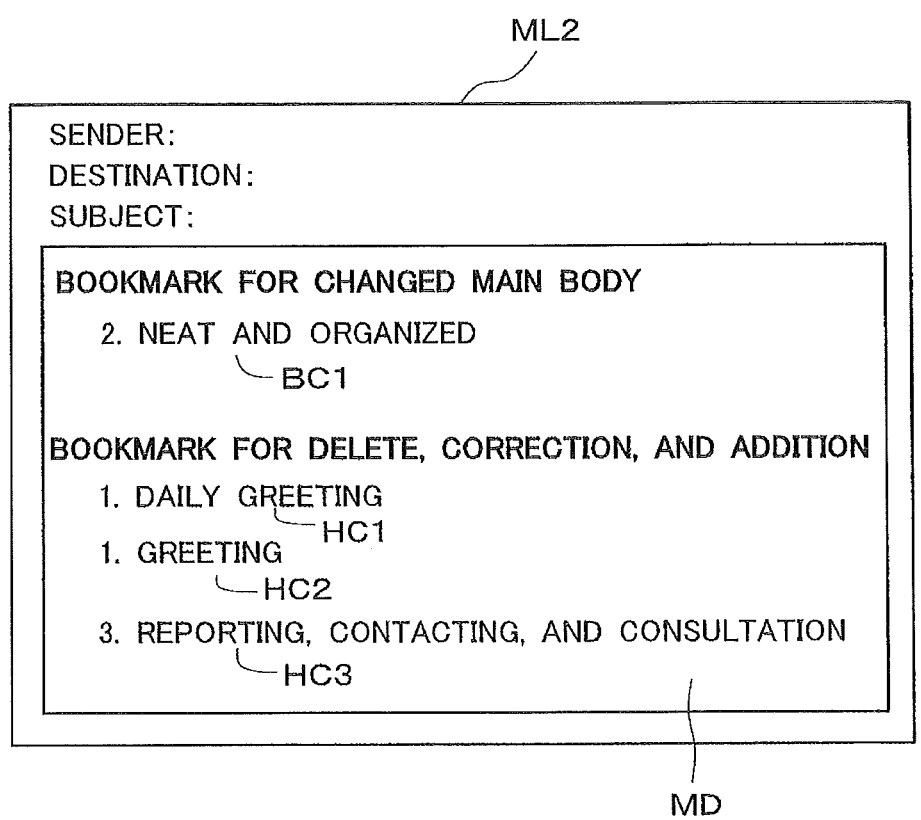
FIG. 40 is a view showing a main body of an electronic mail.

Though the case where the storage controller 16 stores the display information (display data) of the updated portion in the updated manuscript MS2 into the bookmark information area SI2 of the electronic document PF2 in Steps S59, S60, and S62 (in FIG. 5) has been discussed in the above preferred embodiment, this is only one exemplary case. For example, the storage controller 16 may store the display information (display data) of the updated portion into a main body information area of an electronic mail ML2 (see FIG. 40) as shown in FIG. 40. This E-mail ML2 may be sent to a predetermined destination by the communication part 4 and the like. It is preferable that the electronic document PF2 should be attached to the E-mail ML2.

By this variation, since the updated portion is shown in a main body display area MD of the E-mail ML2, a recipient who receives this E-mail ML2 can check the updated portion of the manuscript MS2 in the E-mail ML2. In other words, a reader who reads the E-mail ML2 can easily recognize the updated portion by using the display data in the E-mail ML2.

Further, in the above preferred embodiment, the case where when a header item is updated in the updated manuscript MS2, the storage controller 16 adds the header item to the header change item HC and when a main body other than header items is updated, the storage controller 16 adds the header item relating to the main body is added to the main body change item BC as shown in FIG. 29 has been discussed. In other words, the case where the updated portions are displayed, being separated into the header change item HC and the main body change item BC, has been discussed. This is, however, only one exemplary case.

As shown in FIG. 41, for example, the storage controller 16 may add all the header items relating to the updated portions in the updated manuscript MS2 to a changed item TC collectively. In other words, the updated portions may be displayed, not being separated into the header change item HC and the main body change item BC.

In this case, it is preferable that the storage controller 16 should embed information (link information) for linking a changed item TC2 for the update of the main body other than the header item with the main body information corresponding thereto into the bookmark information area SI2 of the electronic document PF2. With this operation, a reader who reads the electronic document PF2 can display the main body information corresponding to the changed item TC2 in the main body display area HD2 by selecting one of the changed items TC2 displayed in the bookmark display area SD2. The same applies to a changed item TC1.

Since no main body information corresponding to a changed item TC3 or a changed item TC4 for delete or correction is present in the electronic document PF2, it is not easy to set an appropriate link target (jump target). In such a case, the storage controller 16 may embed display data for pop-up display indicating that the changed item TC4 is deleted or corrected into the electronic document PF2. With this operation, when the reader who reads the electronic document PF2 selects the changed item TC3 or TC4, a pop-up display PU is made on the screen as shown in FIG. 42. Therefore, the operator can easily recognize that the header item selected by himself is deleted, corrected, or the like.

While the invention has been shown and described in detail, the foregoing description is in all aspects illustrative and not restrictive. It is therefore understood that numerous modifications and variations can be devised without departing from the scope of the invention.

What is claimed is:

1. A document processing apparatus, comprising:
an image reader for scanning an original manuscript which is not updated to generate first image data on said original manuscript and for scanning an updated manuscript to generate second image data on said updated manuscript;
a text information extraction part for extracting first text information from said first image data and extracting second text information from said second image data;
an updated portion detector for detecting an updated portion of said updated manuscript on the basis of said first text information and said second text information;
an electronic document generator for generating an electronic document of said updated manuscript on the basis of said second image data;
a storage controller for generating display data of said updated portion on the basis of a detection result on said updated portion and storing said display data into said electronic document;
a header item group extraction part for extracting a plurality of header items in said original manuscript as a first header item group from said first text information and extracting a plurality of header items in said updated manuscript as a second header item group from said second text information; and
a node group setting part for hierarchizing said first header item group to construct a node group having a first tree structure and hierarchizing said second header item group to construct a node group having a second tree structure,
wherein said updated portion detector compares said node group of said second tree structure with said node group of said first tree structure to thereby detect said updated portion.

2. The document processing apparatus according to claim 1, wherein
said updated portion detector compares a header item set to each node in said node group of said second tree structure with a header item set to each node in said node group of said first tree structure to thereby detect said updated portion.

3. The document processing apparatus according to claim 2, wherein
said updated portion detector compares a header item set to one node in said second tree structure with a header item set to each node in a node group which is present in the same level as said one node is present, among said node group of said first tree structure, to thereby detect said updated portion.

4. The document processing apparatus according to claim 1, further comprising:
an accompanying information setting part for extracting a first keyword group corresponding to a header item set to each node in said first tree structure from said first text information to set said first keyword group as accompanying information of said each node in said first tree structure and for extracting a second keyword group corresponding to a header item set to each node in said second tree structure from said second text information to set said second keyword group as accompanying information of said each node in said second tree structure,
wherein said updated portion detector compares said accompanying information set to said each node in said second tree structure with said accompanying information set to said each node in said first tree structure to thereby detect said updated portion.

5. The document processing apparatus according to claim 4, wherein
when a header item set to one node in said node group of said second tree structure coincides with a header item set to another node in said node group of said first tree structure, said updated portion detector compares said accompanying information set to said one node with said accompanying information set to said another node to thereby detect said updated portion.

6. The document processing apparatus according to claim 1, wherein
said storage controller stores said display data into an additional information area of said electronic document.

7. The document processing apparatus according to claim 1, further comprising:
a job history recorder for recording a job history which is history information on a plurality of reading jobs each of which is associated with text information of an electronic document relating thereto; and
a specifying part for selecting and specifying a reading job relating to said original manuscript out of said plurality of reading jobs,
wherein said plurality of reading jobs include a scan job of said original manuscript, and
said updated portion detector acquires said text information recorded being associated with said reading job specified by said specifying part as said first text information and compares said first text information with said second text information to thereby detect said updated portion.

8. A document processing apparatus, comprising:
- an image reader for scanning an original manuscript which is not updated to generate first image data on said original manuscript and for scanning an updated manuscript to generate second image data on said updated manuscript;
- a text information extraction part for extracting first text information from said first image data and extracting second text information from said second image data;
- an updated portion detector for detecting an updated portion of said updated manuscript on the basis of said first text information and said second text information;
- an electronic document generator for generating an electronic document of said updated manuscript on the basis of said second image data;
- a storage controller for generating display data of said updated portion on the basis of a detection result on said updated portion and storing said display data into said electronic document;
- a job history recorder for recording a job history which is history information on a plurality of reading jobs each of which is associated with text information of an electronic document relating thereto; and
- a specifying part for selecting and specifying a reading job relating to said original manuscript out of said plurality of reading jobs,
- wherein said plurality of reading jobs include a scan job of said original manuscript, and
- said updated portion detector acquires said text information recorded being associated with said reading job specified by said specifying part as said first text information and compares said first text information with said second text information to thereby detect said updated portion.

9. The document processing apparatus according to claim 8, wherein
- said scan job of said original manuscript is a sending job for scanning said original manuscript to generate a scan image and sending an electronic document generated from said scan image.

10. A document processing apparatus, comprising:
- an image reader for scanning an original manuscript which is not updated to generate first image data on said original manuscript and for scanning an updated manuscript to generate second image data on said updated manuscript;
- a text information extraction part for extracting first text information from said first image data and extracting second text information from said second image data;
- an updated portion detector for comparing said first text information with said second text information to thereby detect an updated portion of said updated manuscript;
- an electronic document generator for generating an electronic document of said updated manuscript on the basis of said second image data;
- a storage controller for storing display data of said updated portion which is generated on the basis of a detection result on said updated portion into a main body information area of an electronic mail to which said electronic document is attached;
- a header item group extraction part for extracting a plurality of header items in said original manuscript as a first header item group from said first text information and extracting a plurality of header items in said updated manuscript as a second header item group from said second text information; and
- a node group setting part for hierarchizing said first header item group to construct a node group having a first tree structure and hierarchizing said second header item group to construct a node group having a second tree structure,
- wherein said updated portion detector compares said node group of said second tree structure with said node group of said first tree structure to thereby detect said updated portion.

11. The document processing apparatus according to claim 10, wherein
- said updated portion detector compares a header item set to each node in said node group of said second tree structure with a header item set to each node in said node group of said first tree structure to thereby detect said updated portion.

12. The document processing apparatus according to claim 11, wherein
- said updated portion detector compares a header item set to one node in said second tree structure with a header item set to each node in a node group which is present in the same level as said one node is present, among said node group of said first tree structure, to thereby detect said updated portion.

13. The document processing apparatus according to claim 10, further comprising:
- an accompanying information setting part for extracting a first keyword group corresponding to a header item set to each node in said first tree structure from said first text information to set said first keyword group as accompanying information of said each node in said first tree structure and for extracting a second keyword group corresponding to a header item set to each node in said second tree structure from said second text information to set said second keyword group as accompanying information of said each node in said second tree structure,
- wherein said updated portion detector compares said accompanying information set to said each node in said second tree structure with said accompanying information set to said each node in said first tree structure to thereby detect said updated portion.

14. The document processing apparatus according to claim 13, wherein
- when a header item set to one node in said node group of said second tree structure coincides with a header item set to another node in said node group of said first tree structure, said updated portion detector compares said accompanying information set to said one node with said accompanying information set to said another node to thereby detect said updated portion.

15. The document processing apparatus according to claim 10, wherein
- said storage controller stores said display data into an additional information area of said electronic document.

16. The document processing apparatus according to claim 10, further comprising:
- a job history recorder for recording a job history which is history information on a plurality of reading jobs each of which is associated with text information of an electronic document relating thereto; and
- a specifying part for selecting and specifying a reading job relating to said original manuscript out of said plurality of reading jobs,
- wherein said plurality of reading jobs include a scan job of said original manuscript, and said updated portion detector acquires said text information recorded being associated with said reading job specified by said specifying part as said first text information and compares said first text information with said second text information to thereby detect said updated portion.

17. A document processing apparatus, comprising:

an image reader for scanning an original manuscript which is not updated to generate first image data on said original manuscript and for scanning an updated manuscript to generate second image data on said updated manuscript;

a text information extraction part for extracting first text information from said first image data and extracting second text information from said second image data;

an updated portion detector for comparing said first text information with said second text information to thereby detect an updated portion of said updated manuscript;

an electronic document generator for generating an electronic document of said updated manuscript on the basis of said second image data;

a storage controller for storing display data of said updated portion which is generated on the basis of a detection result on said updated portion into a main body information area of an electronic mail to which said electronic document is attached;

a job history recorder for recording a job history which is history information on a plurality of reading jobs each of which is associated with text information of an electronic document relating thereto; and a specifying part for selecting and specifying a reading job relating to said original manuscript out of said plurality of reading jobs, wherein said plurality of reading jobs include a scan job of said original manuscript, and said updated portion detector acquires said text information recorded being associated with said reading job specified by said specifying part as said first text information and compares said first text information with said second text information to thereby detect said updated portion.

18. The document processing apparatus according to claim 17, wherein said scan job of said original manuscript is a sending job for scanning said original manuscript to generate a scan image and sending an electronic document generated from said scan image.

* * * * *